(12) United States Patent
Solovyev et al.

(10) Patent No.: US 11,909,959 B2
(45) Date of Patent: Feb. 20, 2024

(54) ENCODER, A DECODER AND CORRESPONDING METHODS FOR MERGE MODE

(71) Applicant: HUAWEI TECHNOLOGIES CO., LTD., Guangdong (CN)

(72) Inventors: Timofey Mikhailovich Solovyev, Moscow (RU); Semih Esenlik, Munich (DE); Jianle Chen, San Diego, CA (US); Anand Meher Kotra, Munich (DE); Biao Wang, Munich (DE); Han Gao, Munich (DE)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/324,401

(22) Filed: May 19, 2021

(65) Prior Publication Data

US 2021/0274168 A1    Sep. 2, 2021

Related U.S. Application Data

(63) Continuation of application No. PCT/RU2019/050221, filed on Nov. 20, 2019.
(Continued)

(51) Int. Cl.
*H04N 19/119* (2014.01)
*H04N 19/176* (2014.01)
*H04N 19/107* (2014.01)

(52) U.S. Cl.
CPC ......... *H04N 19/107* (2014.11); *H04N 19/119* (2014.11); *H04N 19/176* (2014.11)

(58) Field of Classification Search
CPC .... H04N 19/52; H04N 19/107; H04N 19/119; H04N 19/176
See application file for complete search history.

(56) References Cited

U.S. PATENT DOCUMENTS

| 9,648,334 B2 | 5/2017 | Zheng et al. |
| 2005/0089094 A1 | 4/2005 | Yoo et al. |

(Continued)

FOREIGN PATENT DOCUMENTS

| CN | 108174203 A | 6/2018 |
| JP | 2018522466 A | 8/2018 |
| WO | 2016200777 A1 | 12/2016 |

OTHER PUBLICATIONS

Document: JVET-L1001-v2, Benjamin Bross et al., Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, total 174 pages.

(Continued)

*Primary Examiner* — Tsion B Owens
(74) *Attorney, Agent, or Firm* — WOMBLE BOND DICKINSON (US) LLP

(57) ABSTRACT

The present disclosure provides methods and devices of processing a block according to a merge candidate list, the method comprising: constructing a first list according to motion information of neighboring blocks of a current block; obtaining prediction information of the current block; when the prediction information of the current block indicates that a sub-block prediction is applied to the current block, obtaining a uni-prediction candidate for the current block according to the first list; using, the uni-prediction candidate for the current block to perform inter prediction of the current block. According to embodiment of the present disclosure, the regular merge list can be directly used and there is no need to explicitly generate the uni-prediction merge candidate list for sub-block prediction.

20 Claims, 18 Drawing Sheets

Related U.S. Application Data

(60) Provisional application No. 62/788,487, filed on Jan. 4, 2019, provisional application No. 62/770,142, filed on Nov. 20, 2018.

(56) References Cited

U.S. PATENT DOCUMENTS

| | | | |
|---|---|---|---|
| 2015/0085930 | A1 | 3/2015 | Zhang et al. |
| 2017/0310988 | A1 | 10/2017 | Lin et al. |
| 2017/0310990 | A1 | 10/2017 | Hsu |
| 2018/0070100 | A1 | 3/2018 | Chen et al. |
| 2020/0413044 | A1* | 12/2020 | Zhang .................. H04N 19/184 |
| 2021/0281859 | A1* | 9/2021 | Zhang .................. H04N 19/109 |
| 2022/0070456 | A1* | 3/2022 | Chiang .................. H04N 19/52 |

OTHER PUBLICATIONS

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Ru-Ling Liao et al, CE10.3.1.b: Triangular prediction unit mode, JVET-L0124-v2, Panasonic corporation, Joint Video Exploration Team (JVET) of ITU-T SG 16 WP 3 and ISO/IEC JTC 1/SC 29/WG 11, 12th Meeting: Macao, CN, 03 Oct. 12, 2018, 8 pages.

Kondo (Sony) K et al: AHG7: of merge candidate derivation memory bandwidth , 9. JCT-VC Meeting; Apr. 27, 2012-May 7, 2012, JCTVC-I0107_r1, 9 pages.

Hellman (Broadcom) T et al: AHG7: Reducing HEVC worst-case memory bandwidth by restricting bi-directional 4x8 and 8x4 prediction units ,9. JCT-VC Meeting; Apr. 27, 2012-May 7, 2012, JCTVC-I0216-v2, 9 pages.

Ru-Ling Liao et al, CEIO: Triangular prediction unit mode (CEI0.3.1 and CEI0.3.2), JVET-K0144-v2, Joint Video Exploration Team (JVET) of ITU-T SG 16 WP 3 and ISO/IEC JTC 1/SC 29/WG 11, 11th Meeting: Ljubljana, SI, Jul. 10-18, 2018, 6 pages.

Yi-Wen Chen et al. "Description of SDR, HDR and 360 video coding technology proposal by Qualcomm and Technicolor—low and high complexity versions", Joint Video Exploration Team (JVET) of ITU-T SG 16 WP 3 and ISO/IEC JTC 1/SC 29/WG 11, JVET-J0021. 10th Meeting: San Diego, US, Apr. 10-20, 2018. total 43 pages.

Robert (Technicolor) A et al: CEIO-related: Reduction of motionpredictor pruning in Triangle Merge mode , 13. JVET Meeti Ng; Jan. 9, 2019-Jan. 18, 2019, JVET-M0283 v1, 10 pages.

Kin Yakun, Research and optimization of Merge mode candidate decision in HEVC, 2016, 3 pages.

Chen, Chun-Chia et al., Versatile Video Coding (Draft 2), JVET-L0093 (version 2), ITU, Oct. 3, 2018 (year/month/day), pp. 1-3, [online], [retrieved on Aug. 16, 2023], Retrieved from the Internet: URL: https://jvet-experts.org/doc_end_user/docments/12_Macao/wg11/JVET-L0093-v2.zip>, JVET-L0093-v1.docx.

Bross, Benjamin et al., CE4-related: Simplified Pruning in Merge Mode, JVET-L0093 (version 2), ITU, Oct. 3, 2018, pp. 68-70, [online], [retrieved on Aug. 16, 2023], Retrieved from the Internet: URL: https://jvet-experts.org/doc_end_user/documents/12_Maco/wg11/JVET-L0093-v2.zip>, JVET-L0093_DraftText.docx ( JVET-k1001-V5).

\* cited by examiner

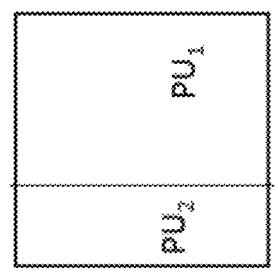
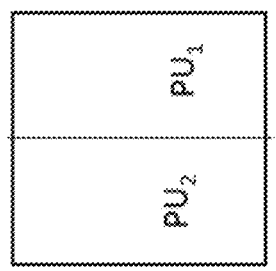
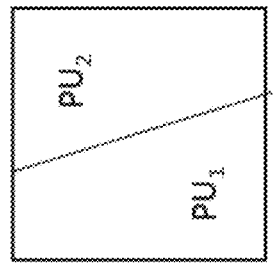
FIG. 11

ENCODER, A DECODER AND CORRESPONDING METHODS FOR MERGE MODE

CROSS-REFERENCE TO RELATED APPLICATIONS

This application is a continuation of International Application No. PCT/RU2019/050221, filed on Nov. 20, 2019, which claims priority rom U.S. provisional application 62/770,142, filed on Nov. 20, 2018 and U.S. provisional application 62/788,487, filed on Jan. 4, 2019. The disclosures of the aforementioned patent applications are hereby incorporated by reference in their entireties.

TECHNICAL FIELD

Embodiments of the present disclosure generally relate to the field of picture processing and more particularly to merge mode.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

According to a first aspect the present disclosure, a method of processing a block according to a merge candidate list is disclosed, the method comprising:

constructing a first list according to motion information of neighboring blocks of a current block; obtaining prediction information of the current block; when the prediction information of the current block indicates that a sub-block prediction is applied to the current block, obtaining a uni-prediction candidate for the current block according to the first list; using, the uni-prediction candidate for the current block to perform inter prediction of the current block.

In this method, regular merge candidate list is re-used for sub-block partition (e.g. triangle, or non-rectangular, and so on) merge prediction with no extra motion vector pruning.

In an embodiment, wherein the current block comprises two sub-blocks, and each sub-block corresponding to a uni-prediction candidate.

In an embodiment, wherein one uni-prediction candidate is generated according to one bi-prediction candidate of the first list.

In an embodiment, wherein two uni-prediction candidates are generated according to one bi-prediction candidate of the first list.

In an embodiment, wherein one uni-prediction candidate is the first part of the bi-prediction candidate.

In an embodiment, wherein one uni-prediction candidate is the second part of the bi-prediction candidate.

In an embodiment, wherein the sub-block prediction is a triangular prediction.

In an embodiment, wherein generation of the two uni-prediction candidates according to the one bi-prediction candidate of the first list comprise:

determining a similarity between the two uni-prediction candidates.

In an embodiment, wherein the uni-prediction candidate is generated according to a bi-prediction candidate of the first list based on order of the candidate in the first list.

According to a second aspect the present disclosure, an encoder comprising processing circuitry for carrying out the method embodiments.

According to a third aspect the present disclosure, a decoder comprising processing circuitry for carrying out the method embodiments.

According to a fourth aspect the present disclosure, a computer program product comprising a program code for performing the method embodiments.

According to a fifth aspect the present disclosure, a decoder, comprising:

one or more processors; and a non-transitory computer-readable storage medium coupled to the processors and storing programming for execution by the processors, wherein the programming, when executed by the processors, configures the decoder to carry out the method embodiments.

According to a sixth aspect the present disclosure, an encoder, comprising:

one or more processors; and a non-transitory computer-readable storage medium coupled to the processors and storing programming for execution by the processors, wherein the programming, when executed by the processors, configures the encoder to carry out the method embodiments.

According to embodiment of the present disclosure, to maximize the common operations shared by different merge modes, the regular merge list is constructed and its motion vectors are used for sub-block prediction. In an example, for each merge candidate in the regular merge candidate list, one and only one of its L0 or L1 motion vector is used for one sub-block prediction. In addition, the order of selecting the L0 vs. L1 motion vector is based on its merge index parity. The regular merge list can be directly used and there is no need to explicitly generate the uni-prediction merge candidate list for sub-block prediction.

In an example, once the regular merge list is constructed, for each merge candidate in the regular merge candidate list, one and only one of its L0 or L1 motion vector is used for one sub-block prediction. In addition, the order of selecting the L0 vs. L1 motion vector is based on its merge index parity. In an example, as shown in table 1, for a candidate with an even value index, its L0 motion vector is first chosen to be used for sub-block prediction. If its L0 motion vector is not available, its L1 motion vector would be used to instead the L0 motion vector. For a candidate with an odd value index, its L1 motion vector is first chosen to be used for triangle prediction. If it is not available, its L0 motion vector would be used instead. In table 1, corresponding to each merge index, the motion vector marked with "x" is first selected for sub-block prediction.

TABLE 1

Uni-prediction MV selection for triangle prediction mode

| Merge Index | L0 MV | L1 MV |
|---|---|---|
| 0 | x | |
| 1 | | x |
| 2 | x | |
| 3 | | x |
| 4 | x | |

According to an embodiment of the present disclosure, the regular merge list can be directly used and there is no need to explicitly generate the uni-prediction merge candidate list for sub-block prediction. At the decoder side, once a sub-block merge index is received, the uni-prediction MV candidate can be easily located based on the signaled merge index value.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the present disclosure are described in more detail with reference to the attached figures and drawings, in which:

FIG. 11 illustrates some examples of Sub-block prediction mode.

Figure 1A:
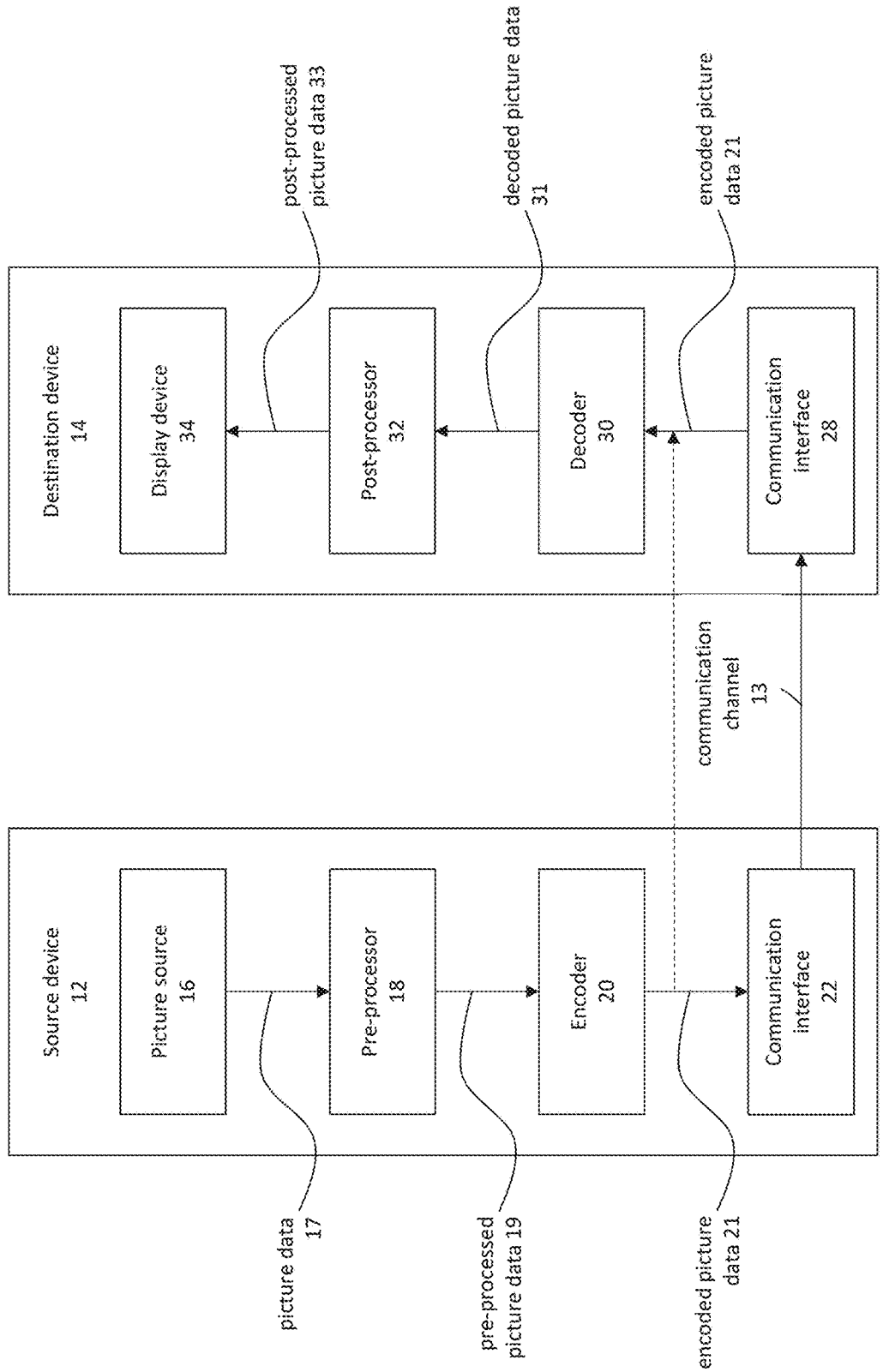
FIG. 1A is a block diagram showing an example of a video coding system configured to implement embodiments of the present disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
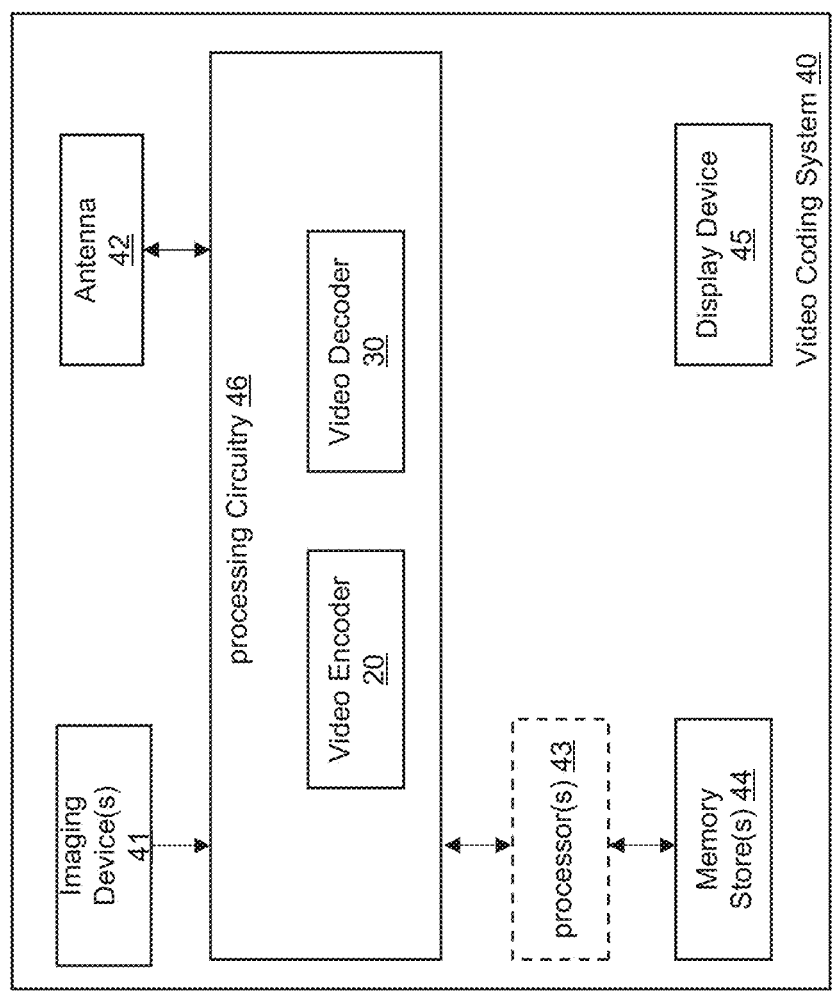
FIG. 1B is a block diagram showing another example of a video coding system configured to implement embodiments of the present disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the present disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present disclosure are not limited to HEVC or VVC.

Encoder and Encoding Method

Figure 2:
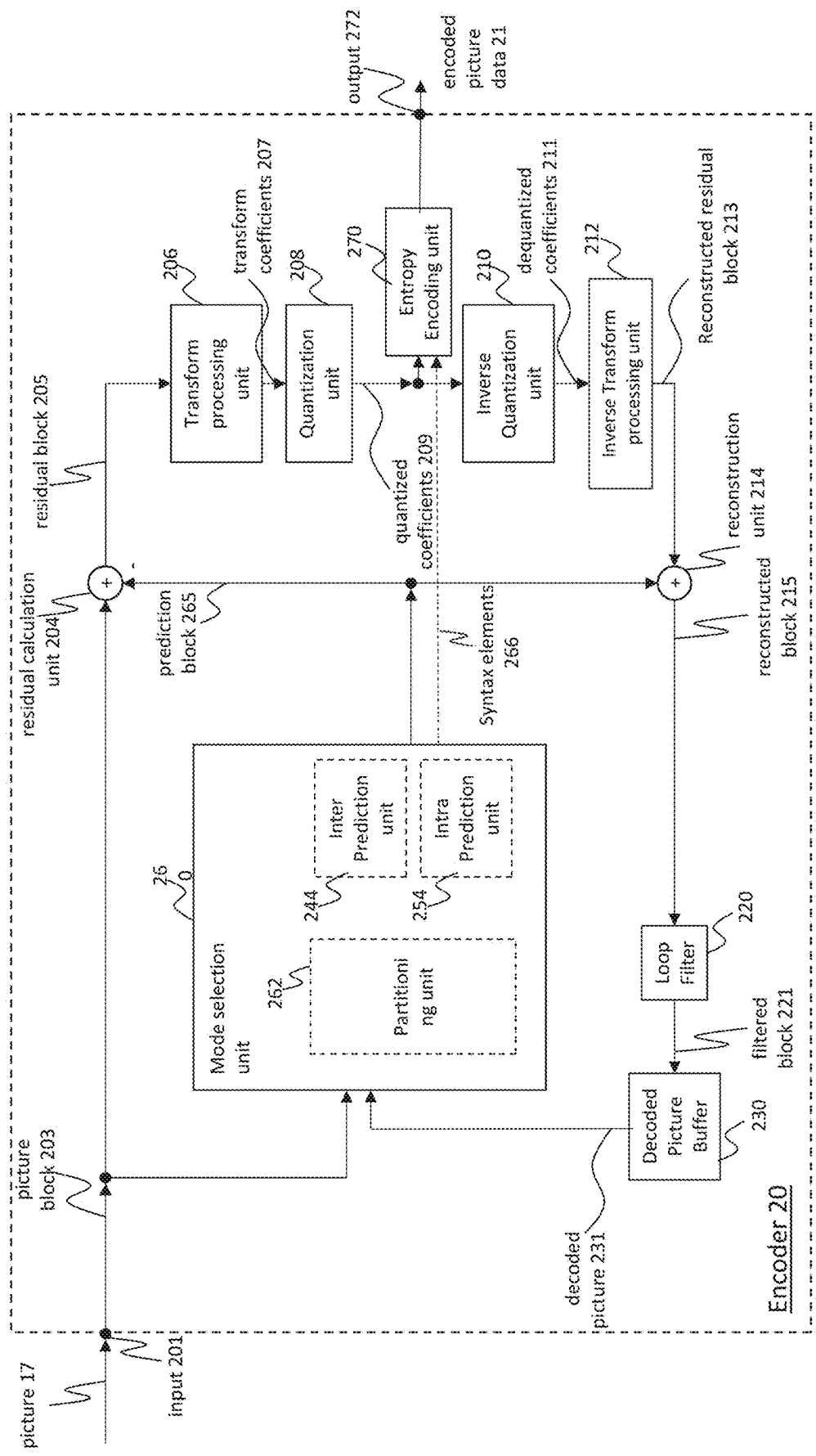
FIG. 2 is a block diagram showing an example of a video encoder configured to implement embodiments of the present disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
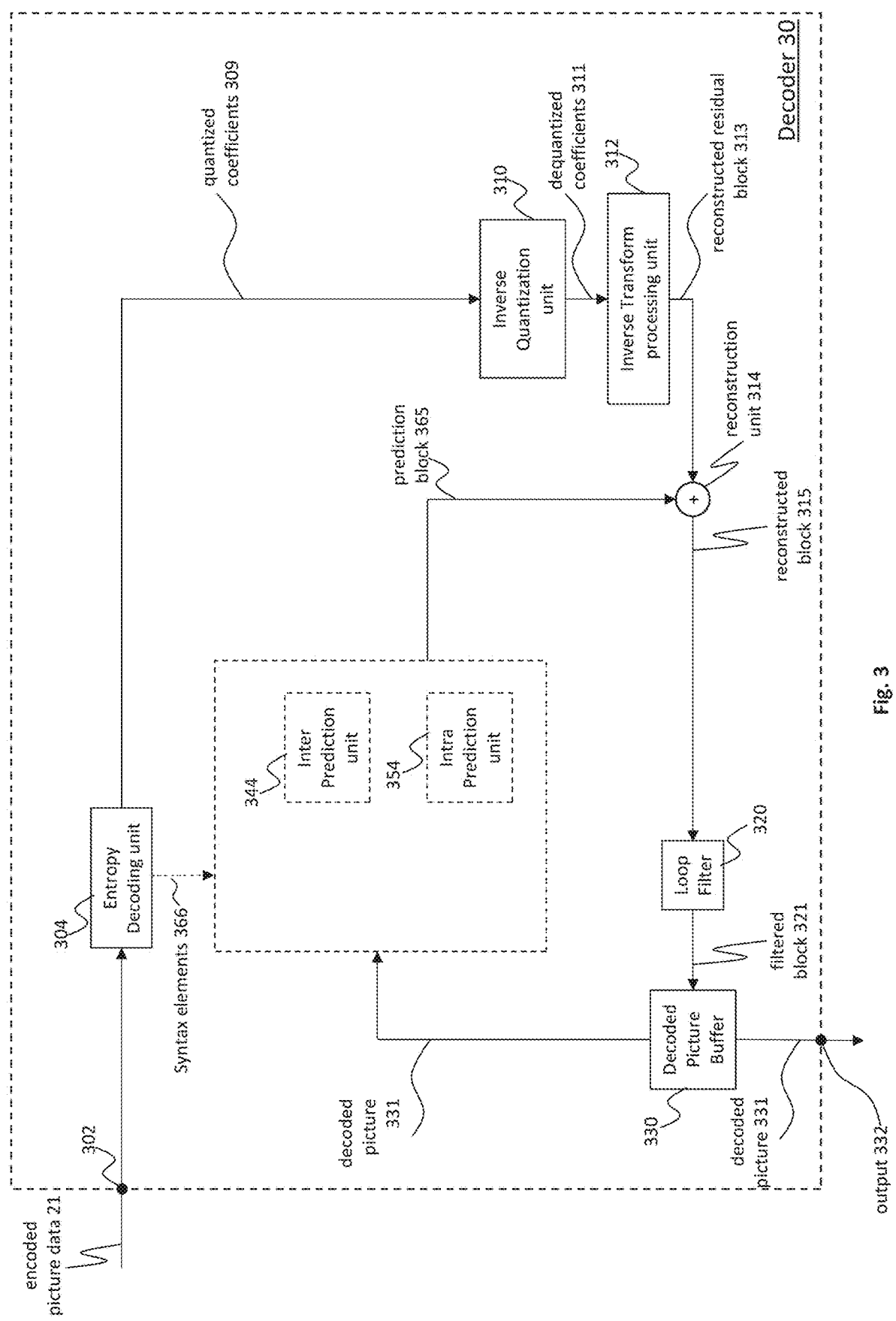
FIG. 3 is a block diagram showing an example structure of a video decoder configured to implement embodiments of the present disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. Here provides two methods for constraining the motion vector.

Method 1: remove the overflow MSB (most significant bit) by the following operations $$ux=(mvx+2^{bitDepth})\%\, 2^{bitDepth} \quad (1)$$

$$mvx=(ux>=2^{bitDepth-1})?(ux-2^{bitDepth}):ux \quad (2)$$

$$uy=(mvy+2^{bitDepth})\%\, 2^{bitDepth} \quad (3)$$

$$mvy=(uy>=2^{bitDepth-1})?(uy-2^{bitDepth}):uy \quad (4)$$

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux=(mvpx+mvdx+2^{bitDepth})\%\, 2^{bitDepth} \quad (5)$$

$$mvx=(ux>=2^{bitDepth-1})?(ux-2^{bitDepth}):ux \quad (6)$$

$$uy=(mvpy+mvdy+2^{bitDepth})\%\, 2^{bitDepth} \quad (7)$$

$$mvy=(uy>=2^{bitDepth-1})?(uy-2^{bitDepth}):uy \quad (8)$$

The operations may be applied during the sum of mvp and mvd, as shown in formula (5) to (8).

Method 2: remove the overflow MSB by clipping the value $$vx=\text{Clip3}(-2^{bitDepth-1}, 2^{bitDepth-1}-1, vx)$$

$$vy=\text{Clip3}(-2^{bitDepth-1}, 2^{bitDepth-1}-1, vy)$$

where the definition of function Clip3 is as follow:

$$\text{Clip3}(x, y, z) = \begin{cases} x\ ; & z < x \\ y\ ; & z > y \\ z\ ; & \text{otherwise} \end{cases}$$

Figure 4:
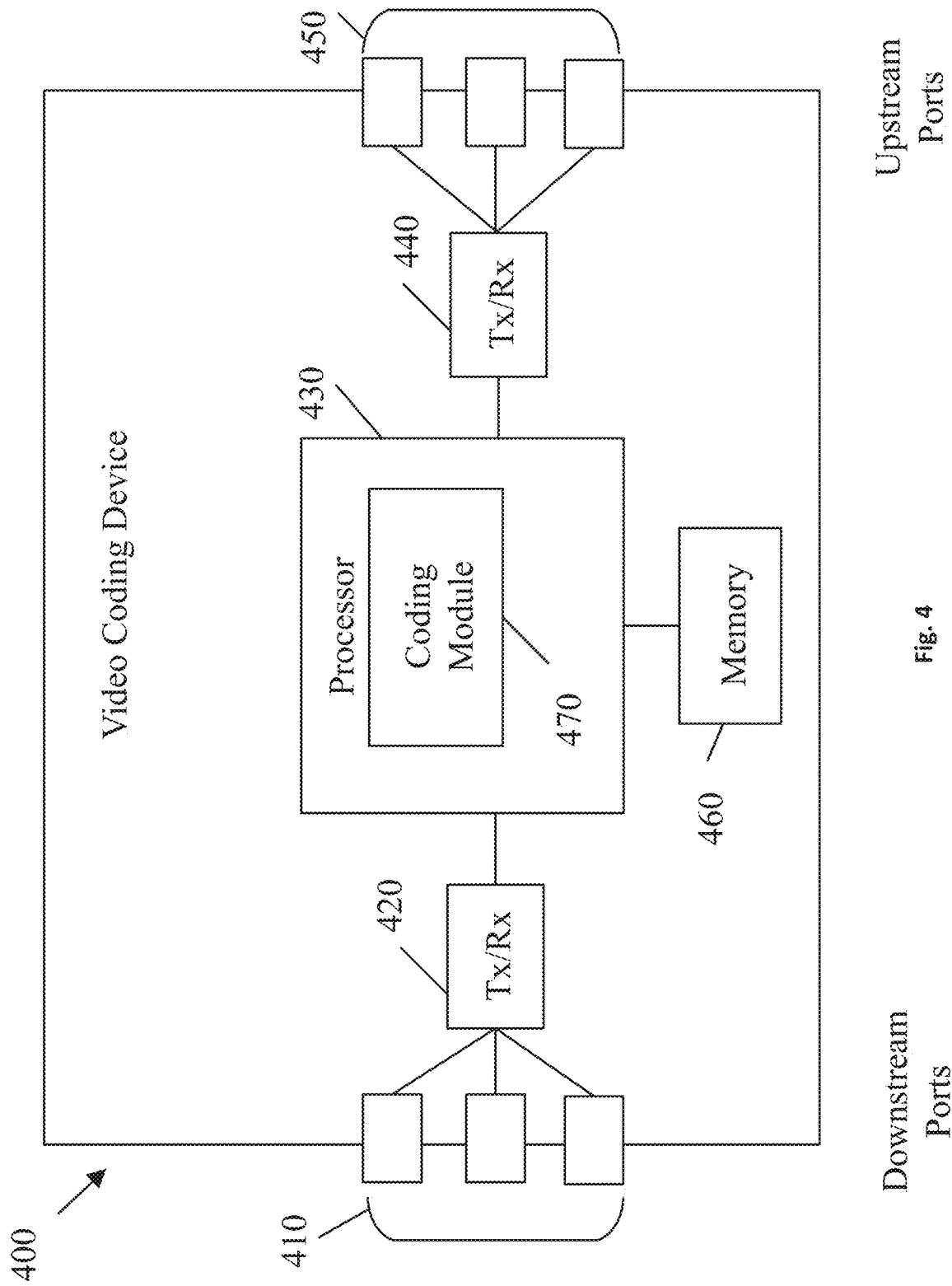
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
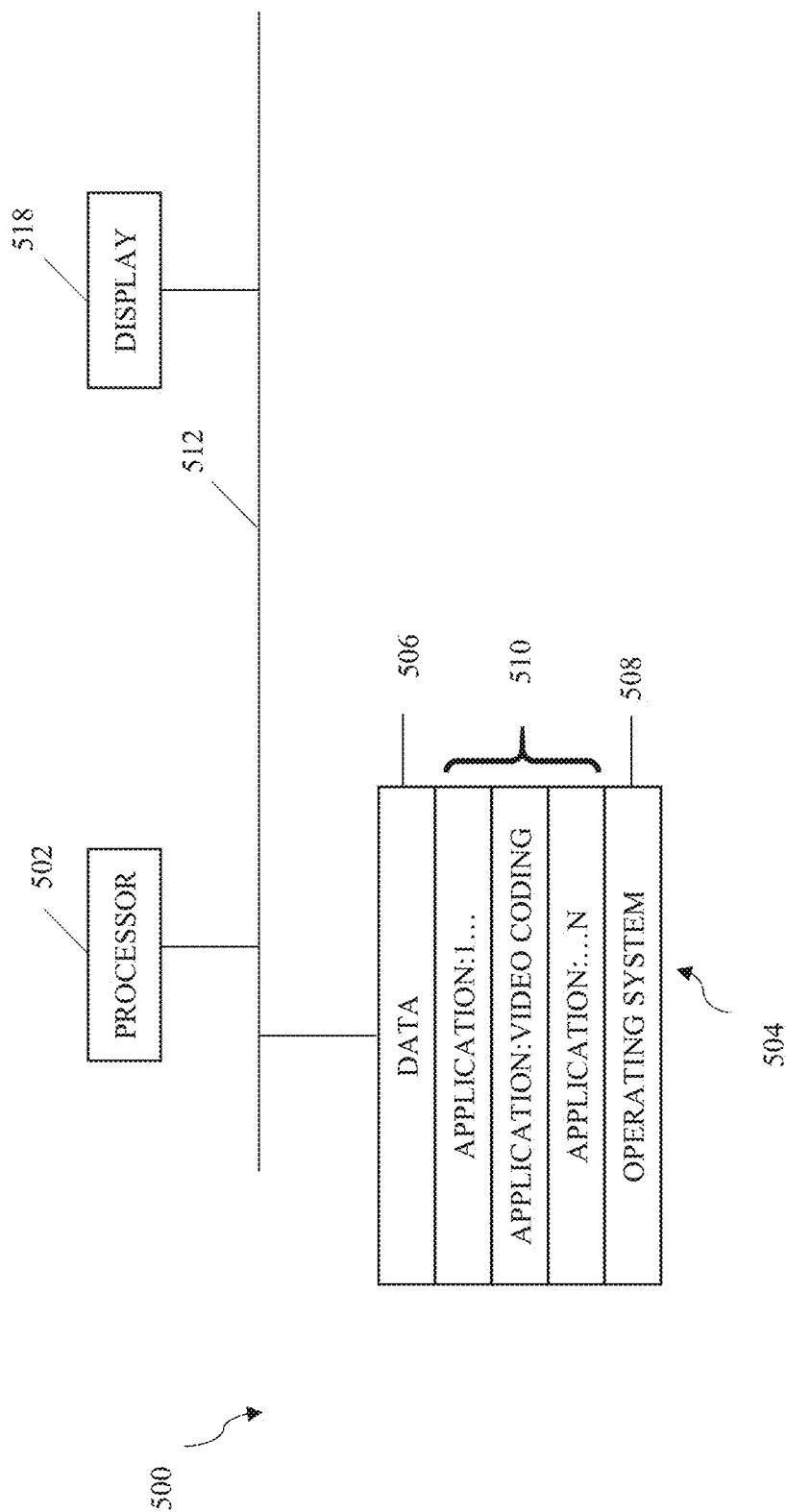
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Merge Candidate List

The process of constructing the merge motion candidate list is introduced by ITU-T H.265 standard. In another embodiment, the merge motion candidate list is used by extended merge prediction of Versatile Video Coding (VVC).

Block merging operation is a special mode (also called as "Merge mode") for motion data coding. Block merging operation allows a current block using the same motion information of a neighbor block. Motion information contains motion data, and the motion data includes the information whether one or two reference picture lists are used, as well as a reference index and a motion vector for each reference picture list. Block merging operation is especially useful if two neighboring blocks correspond to a same non-deformable object in the picture frame. In this case the two blocks might be predicted using the same motion vectors and same reference picture, hence the whole motion information is identical for both blocks.

In an implementation, after checking whether a neighboring block is available and contains motion information, some additional redundancy checks are performed before taking all the motion data of the neighboring block as a motion information candidate.

In an implementation, the merge candidate list is constructed by including the following five types of candidates in order:

1) Spatial MVP from spatial neighbor CUs
2) Temporal MVP from collocated CUs
3) History-based MVP from an FIFO table
4) Pairwise average MVP
5) Zero MVs.

The size of merge list is signaled in slice header and the maximum allowed size of merge list is 6, for example. For each CU code in merge mode, an index of best merge candidate is encoded.

The generation process of each category of merge candidates is provided:

Spatial Candidate Derivation

Figure 12:
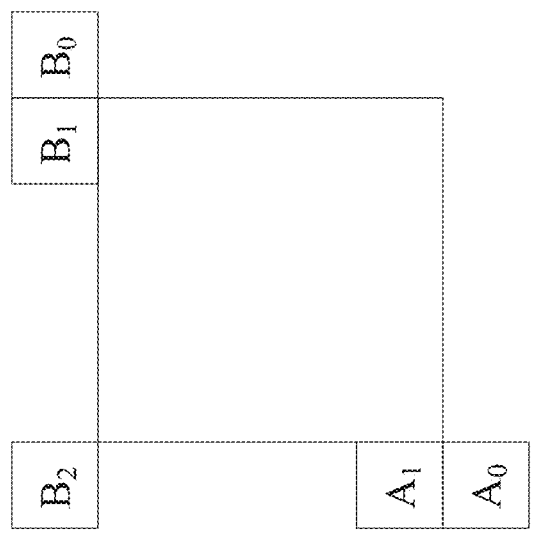
FIG. 12 shows an example about merge candidates are selected among candidates located in the positions.
Figure 13:
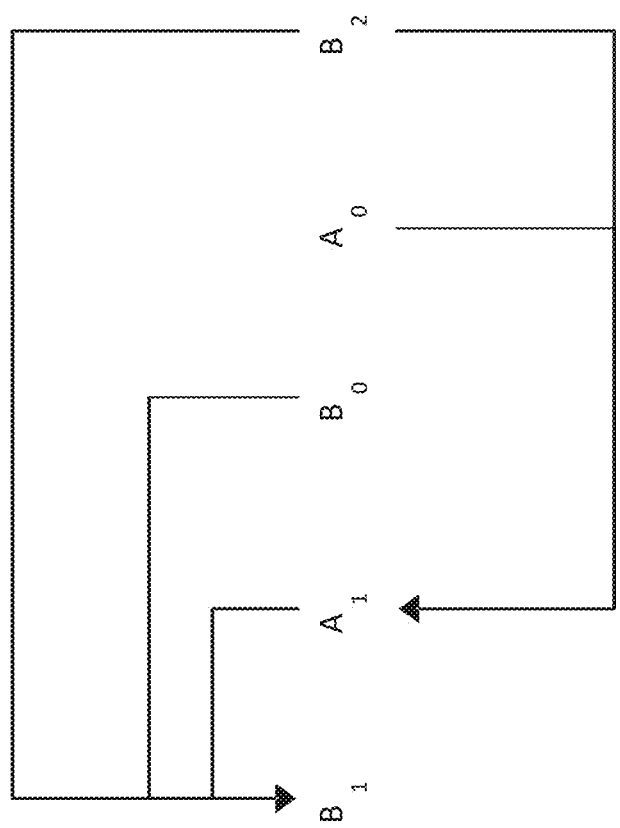
FIG. 13 shows an example about merge candidates.

In an implementation, a maximum of four merge candidates are selected among candidates located in the positions depicted in FIG. 12. The order of derivation is B1, A1, B0, A0 and B2. Position B2 is considered only when any CU of position A0, B0, B1, A1 is not available (e.g. because it belongs to another slice or tile) or is intra coded. After candidate at position B1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 13 are considered and a candidate is only added to the list if the corresponding candidate used for redundancy check has not the same motion information.

During the implementations, the order, the position and the number of spatial neighbors that are considered as changeable, the above example could not be regarded as restriction.

Temporal Candidate Derivation

Figure 14:
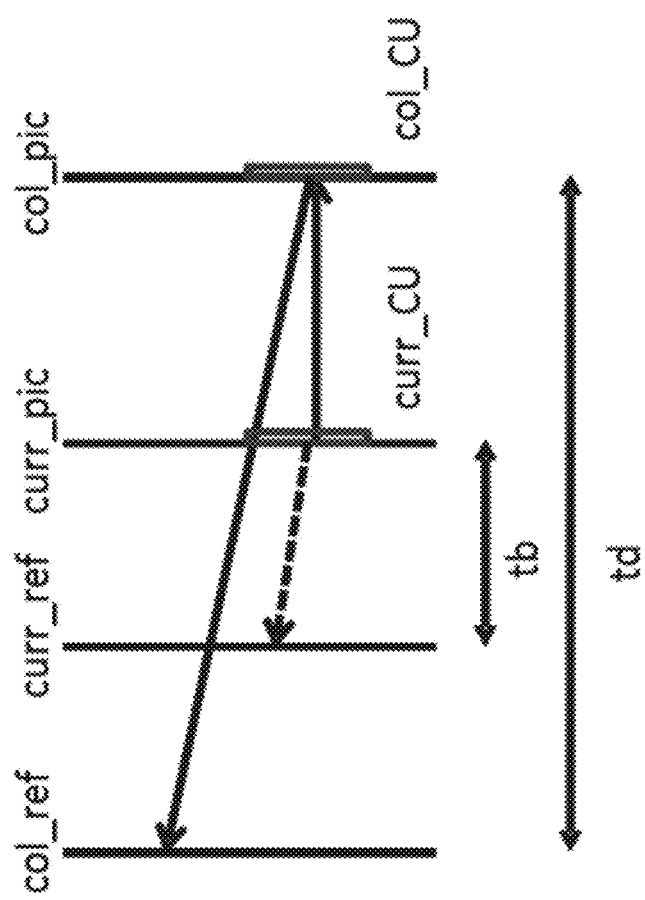
FIG. 14 shows an example about obtain scaled motion vector.

In an implementation, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signaled in the slice header. The scaled motion vector for temporal merge candidate is obtained as illustrated by the dotted line in FIG. 14, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 15:
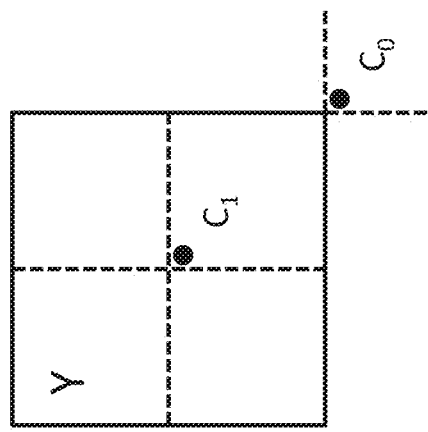
FIG. 15 shows an example about temporal candidate.

The position for the temporal candidate is selected between candidates C0 and C1, as depicted in FIG. 15. If CU at position C0 is not available, is intra coded, or is outside of the current row of CTUs, position C1 is used. Otherwise, position C0 is used in the derivation of the temporal merge candidate.

History-Based Merge Candidate Derivation

The history-based MVP (HMVP) merge candidates are added to merge list after the spatial MVP and TMVP. In an implementation, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 5, which indicates up to 5 History-based MVP (HMVP) candidates may be added to the table, for example. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, different simplifications might be introduced. Generally, once the total number of available merge candidates reaches the maximally allowed merge candidates minus 1, the merge candidate list construction process from HMVP is terminated.

Pair-Wise Average Merge Candidate Derivation

Pairwise average candidates are generated by averaging predefined pairs of candidates in the existing merge candidate list, and the predefined pair is defined as (0, 1), for example, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

In an example about Merge Candidate List Construction according to ITU-T H.265, a merge candidate list is constructed based on the following candidates:

1. up to four spatial candidates that are derived from five spatial neighboring blocks,
2. one temporal candidate is derived from two temporal, co-located blocks, 3. additional candidates including combined bi-predictive candidates and,
4. zero motion vector candidates.

Spatial Candidates

Figure 7B:
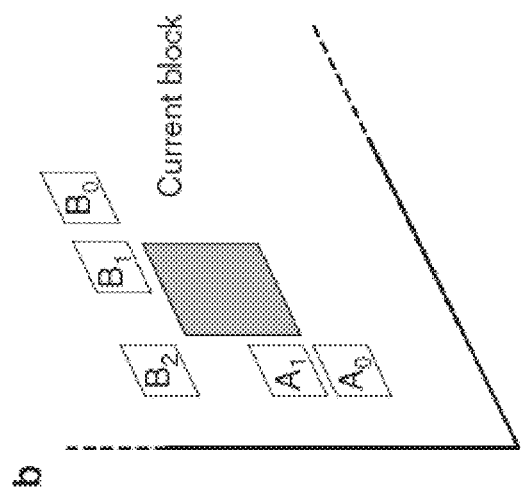
FIG. 7b illustrated an example of spatial neighbor blocks.

The motion information of spatial neighbor blocks are first added into the merge candidate list (in an example, the merge candidate list may be an empty list before the first motion vector is added into the merge candidate list) as motion information candidates. Here, the neighboring blocks that are considered to be inserted in the merge list are illustrated in FIG. 7b. For inter-prediction block merging, up to four candidates are inserted in the merge list by sequentially checking A1, B1, B0, A0 and B2, in that order.

Motion information may contains motion data, that including the information whether one or two reference picture lists are used as well as a reference index and a motion vector for each reference picture list.

In an example, after checking whether a neighboring block is available and whether the neighboring block contains motion information, some additional redundancy checks are performed, before taking all the motion data of the neighboring block as a motion information candidate. These redundancy checks can be divided into two categories:

Category 1, avoid having candidates with redundant motion data in the list, Category 2, prevent merging two partitions that could be expressed by other means which would create redundant syntax.

Temporal Candidates

Figure 7A:
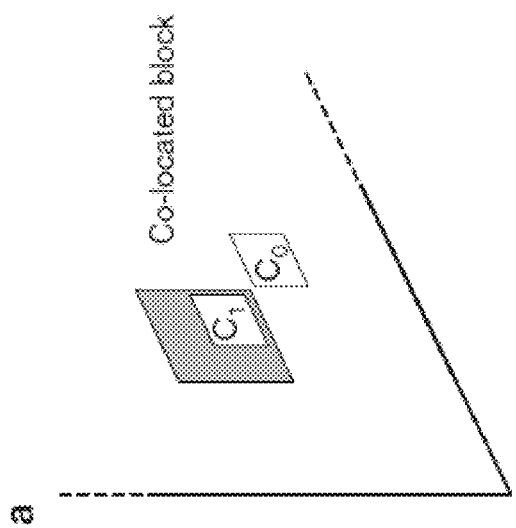
FIG. 7a illustrated an example of Co-located block.

The FIG. 7a illustrated the coordinates of the blocks where temporal motion information candidates are retrieved from. Collocated block is the block that has the same –x, –y coordinates of the current block, but is on a different picture (one of the reference pictures). The temporal motion information candidates are added to the merge list if the list is not full (in an example, the merge list is not full when a quantity of candidates in the merge list is smaller than a threshold, for example, the threshold may be 4, 5, 6, and so on).

Generated Candidates

After insertion of spatial and temporal motion information candidates, if the merge list is still not full, generated candidates are added to fill the list. In an example, a size of the merge list is indicated in the sequence parameter set and is fixed throughout the whole coded video sequence.

Bi-Prediction

A inter prediction mode is called "bi-prediction", where 2 motion vectors are used to predict a block. The motion vectors can point to same reference picture or different reference pictures, where a reference picture can be indicated by a reference picture list ID and a reference picture index. For example, a first motion vector might point to a first picture in the reference picture list L0 and a second motion vector might point to a first picture in the reference picture list L1. Two reference picture lists (for example, L0 and L1) might be maintained, the picture pointed by the first motion vector is selected from list L0 and the picture pointed by the second motion vector is selected from list L1.

In an example, if a motion information indicates bi-prediction, then the motion information includes two parts:

L0 part: A motion vector and a reference picture index that points to an entry in the reference picture list L0.
L1 part: A motion vector and a reference picture index that points to an entry in the reference picture list L1.

Picture Order Count (POC): A variable that is associated with each picture, uniquely identifies the associated picture among all pictures in the Coded Video Sequence (CVS). When the associated picture is to be output from a decoded picture buffer, the POC is used to indicate a position of the associated picture in output order, which is relative to the output order positions of the other pictures in the same CVS that are to be output from the decoded picture buffer.

The reference picture lists L0 or L1 might include one or more reference pictures, each reference picture is identified with a POC. The association with each reference index and the POC value might be signaled in a bitstream. As an example, the reference picture lists L0 and L1 might include the following reference pictures:

| Reference Picture List | Reference Index | POC |
|---|---|---|
| L0 | 0 | 12 |
| L0 | 1 | 13 |
| L1 | 0 | 13 |
| L1 | 1 | 14 |

In the above example, the first entry (indicated by reference index 0) in reference picture list L1 is a reference picture with a POC value 13. The second entry (indicated by reference index 1) in reference picture list L1 is a reference picture with a POC value 14.

Triangular Prediction Mode

Figure 9:
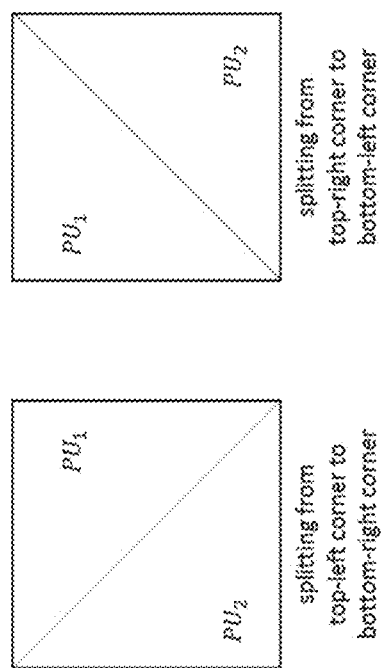
FIG. 9 illustrates an example of triangular prediction mode.

The concept of the triangular prediction mode is a triangular partition for motion compensated prediction. As an example shown in FIG. 9, a CU is divided into two triangular prediction units, in either diagonal or inverse diagonal direction. Each triangular prediction unit in the CU is inter-predicted using uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

In the triangular prediction mode, a block is split into two triangular parts (as in FIG. 9), and each part can be predicted using one motion vector. The motion vectors that is used to predict one triangle part (denoted with PU1) can be different from the motion vectors that is used to predict the other triangle part (denoted with PU2). It is noted that each part can be predicted only using a single motion vector (uni-prediction), in order to reduce the complexity of performing the triangle prediction mode. In other words, the PU1 and PU2 cannot be predicted using bi-prediction.

Sub-Block Prediction Mode

Triangular prediction mode is a special case of sub-block prediction, where a block is divided into two blocks. In the above example, two block division directions are illustrated (45 degree and 135 degree partitions.) However, it is noted that other partition angles and partition proportions are also possible (For example, examples in FIG. 11).

In some examples, a block is split into 2 sub-block parts, and each part is applied uni-prediction. Compared to the triangular prediction mode, the difference is how the block is divided into 2 parts, therefore it represents a generalized version of triangular prediction. As an example, the sub-blocks can be rectangular or non-rectangular depending on the partition angle. In some examples, a current block consists of two prediction units, and the two prediction units are split by a virtual splitting line. In this case, it is called that the current block is predicted by a geometric prediction mode.

The merge list construction process in ITU-T H.265 and in VVC outputs a list of motion information candidates. The merge list construction process of VVC is described in the "8.3.2.2 Derivation process for luma motion vectors for merge mode" section of the document JVET-L1001_v2 Versatile Video Coding (Draft 3), which is publicly available under http://phenix.it-sudparis.eu/jvet/. The term motion information refers to the motion data that is necessary to perform motion compensated prediction process. The motion information usually refers to the following information:

Whether the block applies uni-prediction or bi-prediction;
The ID of the reference picture that is used in the prediction (2 IDs if block applies bi-prediction);
Motion vector (2 motion vectors if block is bi-predicted);
Additional information.

In a recent version of the VVC specification draft text, the merge list construction process is described in "8.3.2.2 Derivation process for luma motion vectors for merge mode" section of the document JVET-L1001_v7 Versatile Video Coding (Draft 3).

It is noted the aspects presented in this application are not restricted to the above three examples. The merge list construction processes described in the above examples have the commonality that, a constructed merge list is used to obtain a prediction of a coding block when triangle prediction mode is not applied to the coding block. The present disclosure methods to generate a second motion information candidate list using the candidates in the merge list (first list), whereas the candidates in the merge list are generated according to some method which could be a method described in any version of VVC or ITU-T H.265.

In VVC and H.265, the output of a merge list construction process include N candidate motion information. The number N is typically included in a bitstream and can be a positive integer number such as 5, 6 etc. The candidates that are included in the constructed merge list might include uni-prediction information or bi-prediction information. This means that the candidate which is selected from the merge list might indicate a bi-prediction operation.

If triangular prediction mode is applied to a coding block, each triangle part in the coding block must be applied with uni-prediction and not be applied with bi-prediction (due to hardware implementation concerns). This means that candidates in the regular merge list that indicate bi-prediction cannot be used, which causes drop in the performance. The problem can be reformulated as follows:

If a block applies triangle prediction mode, an indication is included in a bitstream and is used to indicate a motion information used to predict each triangular part. The indication for instance can be in the form of two merge indices, where a first merge index specifies an entry in the merge list that is applied to predict a first part, and a second merge index specifies an entry in the merge list that is applied to predict the second part.
It is prohibited to apply bi-prediction to individual parts, which means that motion information that are indicated to be used in each part must indicate uni-prediction.
In the merge list, it is possible to have uni-prediction and bi-prediction motion information candidates. Since it is prohibited to select bi-prediction candidates, this causes performance degradation. The candidate list size is effectively reduced, since only uni-prediction candidates can be used.

In VVC, if a block has specific size (4 samples in width or 4 samples in height), it is prohibited to apply bi-prediction to predict the block. The 8×4/4×8 blocks are the smallest possible inter prediction blocks that can be achieved using block partitioning. Bi-prediction is disallowed for the smallest block due to hardware complexity concerns, since the hardware implementations need to consider the smallest possible block as their worst case complexity measure. Therefore, prohibiting the bi-prediction for smallest block reduces the worst case complexity for hardware implementations.

In the case of VVC, if a block has a size of 8×4/4×8, and if the block is coded in merge mode a similar problem as in the case of problem 1 exists.

In an embodiment of the present disclosure (embodiment 1), according to the following operations to construct a merge list.

Operation 1: Construct a motion candidate list (first list) that includes motion information candidates with uni-prediction or bi-prediction.

The first list could be constructed according to the methods in the ITU-T H.265 and in the VVC, see the above examples and disclosures about the merge list construction process in H.265 and in VVC.

Operation 2: Construct a second list using the candidates in the first list as follows: Start from the first candidate of the first list.

Operation 2.1: If the candidate is a uni-prediction candidate, add the candidate (motion information candidate) in the second list.

or,

Operation 2.2: If the candidate is a bi-prediction candidate, two uni-prediction candidates are generated, and the two uni-prediction candidates are added into the second list according to the following order:

the first motion information candidate includes the motion vector and the reference picture index corresponding to L0 reference picture list (The candidate is set as uni-prediction candidate before insertion into second list).
the second motion information candidate includes the motion vector and the reference picture index corresponding to L1 reference picture list (The candidate is set as uni-prediction candidate before insertion into second list).

Operation 2.3: go to the next candidate in the first list and continue with Operation 2.1 or Operation 2.2 until a specified amount of candidates are collected in the second list or until all the candidates in the first list are processed.

The first merge list and the second merge list may be used in the inter prediction process of a current block.

In an example, if triangular prediction is applied to the current block, two candidates in the second list are selected to perform triangular prediction, one candidate is used in prediction process of a first triangular part, and the other candidate is used in the prediction of a second triangular part.

In another example, if a block size of the current block is less than or equal to a threshold (for example, the threshold may be 16) or a block size of the current block is the smallest size that is predefined or signaled in a parameter set, one candidate in second list is selected to perform inter prediction of the current block. In this example, as the size of the current block is small, bi-prediction is disallowed for the current block.

In another example, if a merge mode is applied to the current block and a triangular prediction mode is not applied to the current block, one candidate in first list is selected to perform prediction of the current block, this example is same as the related process which disclosed in the ITU-T H.265 or VVC.

In an example, the first motion candidate list is the merge list.

It is noted that since the candidate list for the triangle (or sub-block) prediction is derived from the Merge mode candidate list, in an implementation, the candidate list might not an independent list. The candidate in the second candidate list might be represented by the indicator points to a candidate in the Merge mode candidate list.

Embodiment 1 discloses a method of constructing a motion information candidate list (second list), the second list comprises uni-prediction candidates.

The first list is used in prediction of a block, if triangular prediction is not applied to the block. In an example, the first list is used for coding blocks that are indicated to apply merge mode but not indicated to apply triangular prediction mode.

The second list is constructed based on the first list. If a triangular prediction is applied to a block, the motion information (or motion vector) candidates are selected from the second list. The second list comprises uni-prediction candidates, the candidates can be applied to first and the second triangular parts of the block. In an example, 2 merge indices are coded in a bitstream if triangular merge mode is applied to the block. The merge indices identify which candidate in the second list is used for the first or the second triangular part of the block.

In another example, if a block size of the current block is less than or equal to a threshold (for example, the threshold may be 16) or a block size of the current block is the smallest size that is predefined or signaled in a parameter set, one merge index is coded in a bitstream to identify which candidate in the second list is used to predict the block. If a block size of the current block is greater than a threshold (for example, the threshold may be 16) or a block size of the current block is not the smallest size that is predefined or signaled in a parameter set, a merge index is coded in a bitstream to identify which candidate in the first list is used to predict the block.

Figure 6:
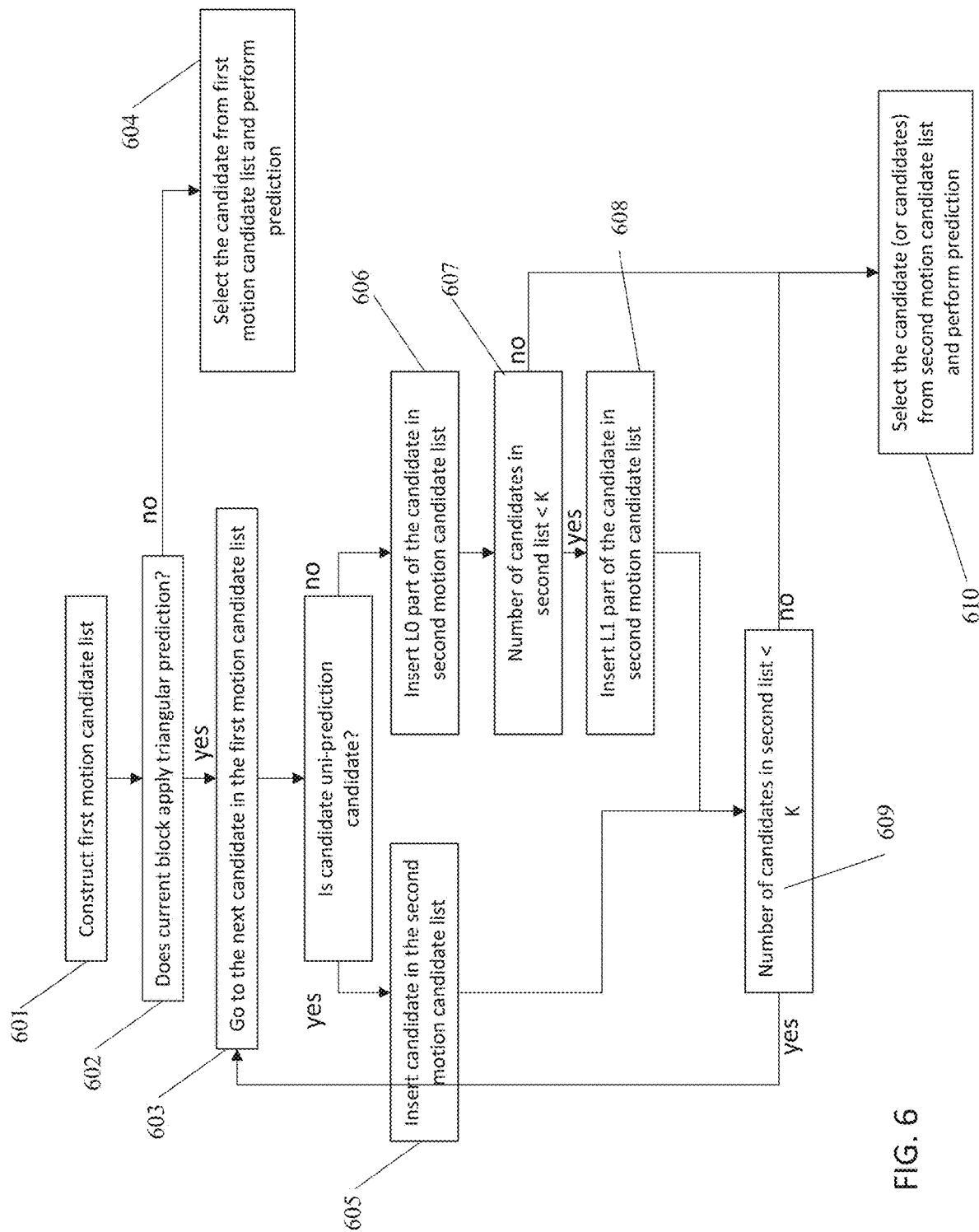
FIG. 6 is a flowchart shows an example of the construction of second motion candidate list based on the first motion candidate list.

FIG. 6 depicts the flowchart of an implementation of embodiment 1. The flowchart shows the construction of second motion candidate list based on the first motion candidate list. According to 602, if triangular prediction is applied to the block, the second motion candidate list is used to predict the block; if triangular prediction is not applied to the block, the first motion candidate list is used to predict the block. In another example, the condition in 602 may comprise a block size check. According to the result of the block size check, the first motion candidate list or the second motion candidate list might be used to predict the block.

In another example, if the block is determined not to apply triangular prediction, other conditions can be checked to decide whether the block uses the first motion candidate list or not. In one example, if a block is determined not to apply triangular prediction, it is further determined if the block applies merge mode or not. If merge mode is applied, first motion candidate list is used in predicting the block; and if merge mode is not applied, other methods of predicting the current block (e.g. intra prediction) might be applied.

According to embodiment 1, a second motion candidate list is constructed based on the first motion candidate list. The second list may comprises uni-prediction candidates only, therefore have the advantage not comprising non-usable candidates (for example, bi-predictive candidates). Therefore, the indicator, to signal which candidate is used, can be represented by fewer number of bits, which improve the compression efficiency.

In an embodiment of the present disclosure (embodiment 2), according to the following operations to construct a merge list.

Operation 1: Construct a motion candidate list (first list) that includes motion information candidates with uni-prediction or bi-prediction.

The first list could be constructed according to the methods in the ITU-T H.265 and in the VVC, see the above examples and disclosures about the merge list construction process in HEVC and in VVC.

Operation 2: Construct a second list using the candidates in the first list as follows: Start from the first candidate of the first list.

Operation 2.1: If the candidate is a uni-prediction candidate, add the candidate (motion information candidate) in the second list.

or,

Operation 2.2: If the candidate is a bi-prediction candidate, two uni-prediction candidates are generated and the two uni-prediction candidates are added into the second list according to the following order:

the first candidate includes the motion vector and the reference picture index corresponding to L0 reference picture list. The motion vector is denoted mv_L0 and the POC value of the reference picture (calculated based on the reference picture index in list L0) is denoted as POC_L0;

the second candidate includes the motion vector and the reference picture index corresponding to L1 reference picture list. The motion vector is denoted mv_L1 and the POC value of the reference picture (calculated based on the reference picture index in list L1) is denoted as POC_L1. If POC_L0 is equal to POC_L1, and if mv_L0 is similar to mv_L1, then the second candidate is not comprised in the second list. The second candidate is included in the second list if either POC_L0 is not equal to POC_L1 or if mv_L0 is not similar to mv_L1.

Operation 2.3: go to the next candidate in the first list and continue with Operation 2.1 or Operation 2.2 until a specified amount of candidates are collected in the second list or until all the candidates in the first list are processed.

The first merge list and the second merge list may be used in the inter prediction process of a current block.

In an example, if triangular prediction (or subblock prediction) is applied to the current block, two candidates in the second list are selected to perform triangular prediction (or subblock prediction), one candidate is used in prediction process of a first triangular part and the other candidate is used in the prediction of a second triangular part.

In another example, if a block size of the current block is less than or equal to a threshold (for example, the threshold may be 16) or a block size of the current block is the smallest size that is predefined or signaled in a parameter set, one motion information candidate in second list is selected to perform inter prediction of the current block. In this example, as the size of the current block is small, bi-prediction is disallowed for the current block.

In another example, if a merge mode is applied to the current block and a triangular prediction mode is not applied to the current block, one candidate in first list is selected to perform prediction of the current block, this example is same as the related process which disclosed in the ITU-T H.265 or VVC.

In an example, the second candidate in Operation 2.2 is not added to the second list if POC_L0 is equal to POC_L1 and if mv_L0 is identical to mv_L1.

In another example, the second candidate in Operation 2.2 is not added to the second list if reference picture index of L0 part is same as reference picture index of L1 part and if mv_L0 is identical (or alternatively similar) to mv_L1.

In an example, the similarity of two motion vectors may be determined according to following inequalities:

$$-K<(MV1.x-MV2.x)<K \text{ and } -K<(MV1.y-MV2.y)<K$$

where the MV1.x denotes the x component of the first motion vector (the means of MV2.x is similar as MV1.x), MV1.y (the means of MV2.y is similar as MV1.y) denotes they component, K is a positive number. In this example if both inequalities hold, the motion vector MV1 is considered to be similar to motion vector MV2.

In another example, the similarity may be determined based on the following equalities:

$$(MV1.x>>N)-(MV2.x>>N)<K \text{ and } (MV1.x>>N)-(MV2.x>>N)<K.$$

Where, x>>y means Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. "==" is the rational operation which is true when each side of the operator is identical. In this example if both equalities hold, the motion vector MV1 is considered to be similar to motion vector MV2.

In an example, the first motion candidate list is the merge list.

It is noted that since the candidate list for the triangle (or sub-block) prediction is derived from the Merge mode candidate list, in an implementation, the candidate list might not be an independent list. The candidate in the second candidate list might be represented by the indicator that points to a candidate in the Merge mode candidate list.

Figure 8:
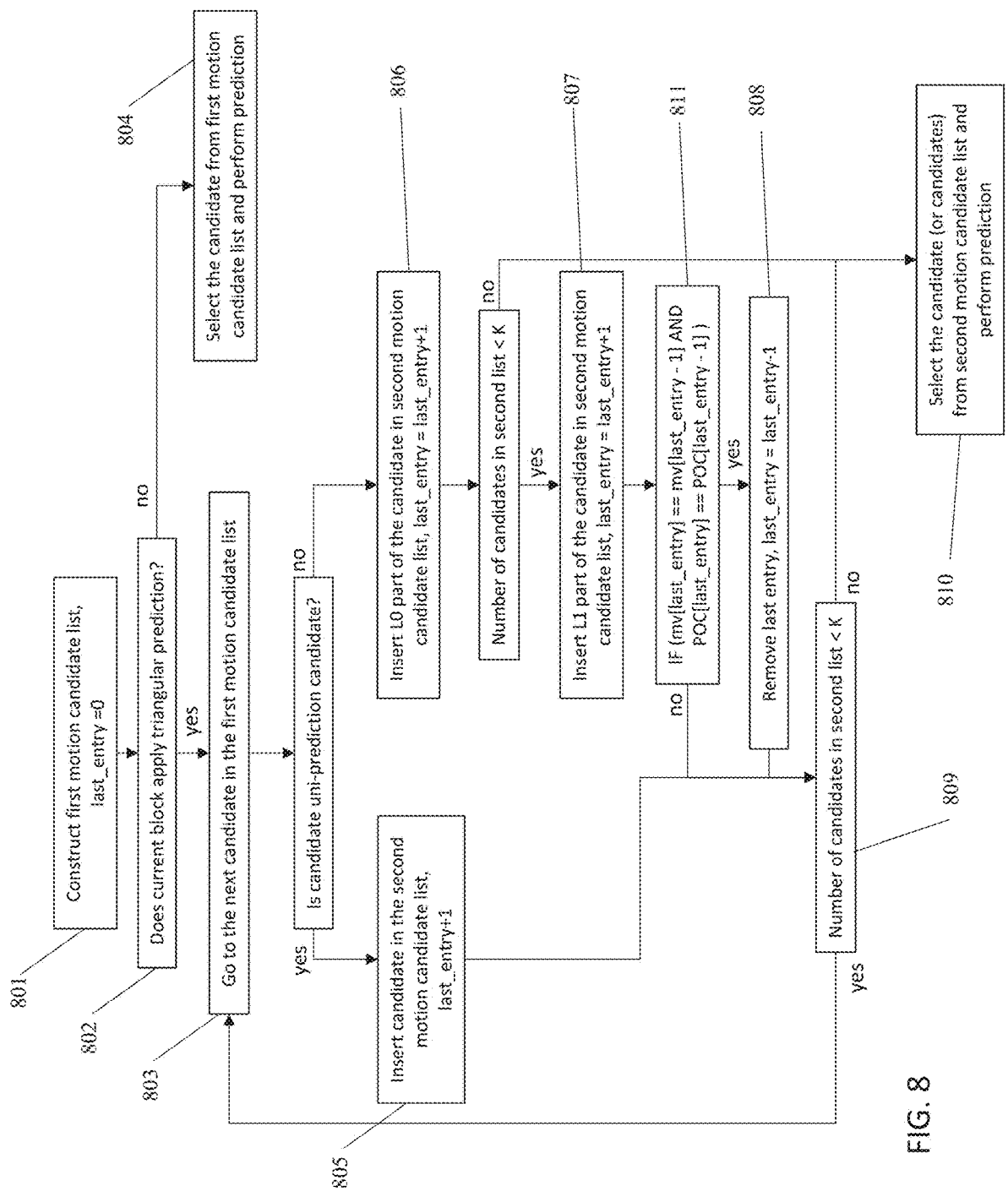
FIG. 8 is a flowchart showing another example of the construction of second motion candidate list based on the first motion candidate list.

The flowchart for an implementation of embodiment 2 is illustrated in FIG. 8. The difference to embodiment 1 is in operation 811. In operation 811, the L1 part of the bi-predicted candidate is compared with the L0 part (motion vector of L0 part is compared with the motion vector of L1 part, and the POC of reference picture of L0 part is compared with the POC of the reference picture of L1 part). If according to a similarity measure L0 part is similar to L1 part, then the uni-prediction candidate that is generated based on the L1 part is not inserted into the second motion candidate list.

In operation 2.2, the second candidate (which is a uni-prediction candidate that is generated based on the L1 part of the bi-prediction candidate of first motion candidate list) is added to the second motion candidate list only if it is sufficiently different from the first candidate (which is a uni-prediction candidate that is generated based on the L0 part of the bi-prediction candidate of first motion candidate list).

Since the L1 part is not inserted in the second list when it is similar to L0 part (or identical), the compression efficiency is improved.

In FIG. 8, operation 2.2 is illustrated by means of 807, 811 and 808. First according to 807, L1 part of the bi-prediction motion candidate is inserted into the second list. Then the last entry (indicated by index value last_entry) in the second list is compared with the previous entry (indicated by index value last_entry−1) in the second list according to 811. If the POC value of the last entry is same as the POC value of previous entry and motion vector of last entry is identical to the motion vector of previous entry, the last entry is removed from the second list according to 808. It is noted that the combination of 807, 811 and 808 correspond to the operation2.2 of the present disclosure embodiment.

In an embodiment of the present disclosure (embodiment 3), according to the following operations to construct merge lists.

Operation 1: Construct a motion candidate list (first list) that includes motion information candidates with uni-prediction or bi-prediction.

The first list could be constructed according to the methods in the ITU-T H.265 and in the VVC, see the above examples and disclosures about the merge list construction process in HEVC and in VVC.

Operation 2: The first list is updated as follows,

For all entries in the first list:

Check if the candidate is a bi-prediction candidate or not.
  If the candidate is a bi-prediction candidate, the motion vector that belongs to L0 part is denoted as mv_L0, reference index is denoted as ref_idx_L0 and the POC value of the reference picture (calculated based on the reference picture index in list L0) is denoted as POC_L0. The motion vector that belongs to L1 part is denoted as mv_L1, reference index is denoted as ref_idx_L1 and the POC value of the reference picture (calculated based on the reference picture index in list L1) is denoted as POC_L1.
  If POC_L0 is equal to POC_L1, and if mv_L0 is similar (or identical in another example of the embodiment) to mv_L1, the candidate is updated as uni-prediction candidate with motion vector set to MV_L0, reference picture list set to L0 and reference index set to ref_idx_L0.

Operation 3: Construct a second list using the candidates in the first list as follows:

Operation 3.1: Start from the first candidate of the updated first list.

Operation 3.2: If the candidate is a uni-prediction candidate, add the candidate (motion information candidate) in the second list.

or,

Operation 3.3: If the candidate is a bi-prediction candidate, two uni-prediction candidates are generated and the two uni-prediction candidates are added into the second list according to the following order:
  the first candidate includes the motion vector and the reference picture index corresponding to L0 reference picture list.
  the second candidate includes the motion vector and the reference picture index corresponding to L1 reference picture list.

Operation 3.4: go to the next candidate in the first list and continue with Operation 3.2 or Operation 3.3 until a specified amount of candidates are collected in the second list or until all the candidates in the first list are processed.

In an example, if triangular prediction is applied to the current block, two candidates in the second list are selected to perform triangular prediction, one candidate is used in prediction process of a first triangular part and the other candidate is used in the prediction of a second triangular part.

In another example, if a block size of the current block is less than or equal to a threshold (for example, the threshold may be 16) or a block size of the current block is the smallest size that is predefined or signaled in a parameter set, one motion information candidate in second list is selected to perform inter prediction of the current block. In this example, as the size of the current block is small, bi-prediction is disallowed for the current block.

In another example, if a merge mode is applied to the current block and a triangular prediction mode is not applied to the current block (or a block size of the current block is greater than a threshold (for example, the threshold may be 16) or a block size of the current block is not the smallest size that is predefined or signaled in a parameter set), a candidate in the first list is selected to perform prediction of the current block.

In an embodiment of the present disclosure (embodiment 4), according to the following operations to construct merge lists.

Operation 1: Construct a motion candidate list (first list) that includes motion information candidates with uni-prediction or bi-prediction.

The first list could be constructed according to the methods in the ITU-T H.265 and in the VVC, see the above examples and disclosures about the merge list construction process in HEVC and in VVC.

Operation 2: Construct a second list using the candidates in the first list as follows:

Operation 2.1: Start from the first motion information candidate of the first list.

Operation 2.2: If the candidate is a uni-prediction candidate, add the candidate (motion information candidate) in the second list.

Operation 2.3: go to the next candidate in the first list, and continue with Operation 2.2 until a specified amount of candidates are collected in the second list or until all the candidates in the first list are processed.

Operation 2.4: Start from the first candidate of the first list.

Operation 2.5: If the candidate is a bi-prediction candidate, two uni-prediction candidates are generated and added to the second list according to the following order:
the first motion information candidate includes the motion vector and the reference picture index corresponding to L0 reference picture list. Add the first candidate to the second list.
the second motion information candidate includes the motion vector and the reference picture index corresponding to L1 reference picture list. Add the second candidate to the second list if the second list is not full.

Operation 2.6: go to the next candidate in the first list and continue with Operation 2.5 until a specified amount of candidates are collected in the second list or until all the candidates in the first list are processed.

The first merge list and the second merge list may be used in the inter prediction process of a current block.

It is noted that since the candidate list for the triangle (or sub-block) prediction is derived from the Merge mode candidate list, in an implementation, the candidate list might not an independent list. The candidate in the second candidate list might be represented by the indicator points to a candidate in the Merge mode candidate list.

In an example, if triangular prediction is applied to the current block, two candidates in the second list are selected to perform triangular prediction, one candidate is used in prediction process of a first triangular part and the other candidate is used in the prediction of a second triangular part.

In another example, if a block size of the current block is less than or equal to a threshold (for example, the threshold may be 16) or a block size of the current block is the smallest size that is predefined or signaled in a parameter set, one candidate in second list is selected to perform inter prediction of the current block. In this example, as the size of the current block is small, bi-prediction is disallowed for the current block.

In another example, if a merge mode is applied to the current block and a triangular prediction mode is not applied to the current block, one candidate in first list is selected to perform prediction of the current block, this example is same as the related process which disclosed in the ITU-T H.265 or VVC.

In an embodiment of the present disclosure (embodiment 5), a size of the second list (motion candidate list) is smaller than or equal to a size of the first list.

For example, a size of the second list is set equal to M, if M is determined to be smaller than or equal to N, where N is the size (number of motion candidates) of the first list. Otherwise (if M is determined to be greater than N) size of the second list is set equal to N.

In another example, N can be derived from an indicator that is coded in a bitstream, and M can be a predefined number. M and N can be positive integer numbers, e.g. M might be equal to 5 and N equal to 6.

An example of this embodiment is as follows: The value M (describing the maximum size of the second list) might be 5, which is predetermined. And the value of N (size of the first list) might be signaled in the sequence parameter set (SPS). If the value of N is signaled as 6, the size of the second list is set equal to 5, since size of the first list is greater than the size of the second list. In another scenario, if N is signaled to be 3 in the SPS, then the size of the second list is also set equal to 3.

In another example, N can be derived from an indicator that is coded in a bitstream and M can be derived from an indicator that is also coded in the bitstream. In this example, the indicator which is used to derive the value of M cannot indicate an M value that is greater than N.

In another example, in ITU-T H.265, the size of the merge list (first list) is N, and N can be modified based on a syntax element that is coded in a bitstream. The value of N can be a positive integer number (for example, the value of the positive integer number is between 2 to 5), and the value of the positive integer number is signaled in the SPS. The size of the merge list is fixed for the whole video sequence.

According to the embodiment 5, a size of the second list is smaller than or equal to a size of the first list. In some examples, the size of the second list is also fixed, for error robustness purposes. According to the above embodiments 1 to 4, the second list is construct based on the first list. A size of the second list is smaller than or equal to the size of the first list. If all of the candidates in the first list are uni-prediction candidates, in which case the maximum number of motion candidates that can be inserted in the second list is equal to the number of candidates in the first list. Therefore if the size of the second list is set equal to or smaller than the first list, the second list is guaranteed to be always filled completely.

According to another embodiment (embodiment 6), a size of the second list is determined based on a size of the current block. If the size of the current block is smaller than a threshold, the size of the second list is set equal to K, and if the size of the current block is greater than or equal to the threshold, the size of the second list is set equal to L. The size of the block can be determined based on its width and height (e.g. width multiplied by height). The K and L are positive integer numbers with K<L.

For example, if the width multiplied by height of a block is greater than or equal to 128, the size of the second list can be set equal to 5. If the width multiplied by height of the block the smaller than 128, the size of the second list can be set equal to 3.

In another example, if the width of the block is smaller than or equal to 8 or the height of the block is smaller than or equal to 8, than the size of the second list is set equal to 3. If both width and height of the block are greater than 8, then the size of the second list is set equal to 5.

In an embodiment of the present disclosure (embodiment 7), according to the following operations to construct merge lists.

Operation 1: Construct a motion candidate list (first list) that includes motion information candidates with uni-prediction or bi-prediction.

The first list could be constructed according to the methods in the ITU-T H.265 and in the VVC, see the above examples and disclosures about the merge list construction process in H.265 and in VVC.

Operation 2: Construct a second list using the candidates in the first list as follows:

Operation 2.1: Start from the first candidate of the first list.

Operation 2.2: If the motion information candidate is a uni-prediction candidate, add the candidate (motion information candidate) in the second list.

or,

Operation 2.3: If the motion information candidate is a bi-prediction candidate, one uni-prediction candidate is generated based on the bi-prediction candidate and added to the second list as follows:

the generated uni-prediction motion information candidate includes the motion vector and the reference picture index corresponding to L0 reference picture list (The candidate is set as uni-prediction candidate before insertion into second list).

Operation 2.4: go to the next candidate in the first list and continue with Operation 2.2 or Operation 2.3 until a specified amount of candidates are collected in the second list or until all the candidates in the first list are processed.

The first merge list and the second merge list may be used in the inter prediction process of a current block.

In an example, if triangular prediction is applied to the current block, two candidates in the second list are selected to perform triangular prediction, one candidate is used in prediction process of a first triangular part and the other candidate is used in the prediction of a second triangular part.

In another example, if a block size of the current block is less than or equal to a threshold (for example, the threshold may be 16) or a block size of the current block is the smallest size that is predefined or signaled in a parameter set, one candidate in second list is selected to perform inter prediction of the current block. In this example, as the size of the current block is small, bi-prediction is disallowed for the current block.

In another example, if a merge mode is applied to the current block and a triangular prediction mode is not applied to the current block, one candidate in first list is selected to perform prediction of the current block, this example is same as the related process which disclosed in the ITU-T H.265 or VVC.

In an example, the first motion candidate list is the merge list.

It is noted that since the candidate list for the triangle (or sub-block) prediction is derived from the Merge mode candidate list, in an implementation, the candidate list might not an independent list. The candidate in the second candidate list might be represented by the indicator points to a candidate in the Merge mode candidate list.

Embodiment 7 discloses a method of constructing a motion information candidate list (second list), the second list comprises uni-prediction candidates.

The first list is used in prediction of a block, if triangular prediction is not applied to the block. In an example, the first list is used for coding blocks that are indicated to apply merge mode but not indicated to apply triangular prediction mode.

The second list is constructed based on the first list. If a triangular prediction is applied to a block, the motion information (or motion vector) candidates are selected from the second list. The second list comprises uni-prediction candidates, the candidates can be applied to first and the second triangular parts of the block. In an example, 2 merge indices are coded in a bitstream if triangular merge mode is applied to the block. The merge indices identify which candidate in the second list is used for the first or the second triangular part of the block.

In another example, if a block size of the current block is less than or equal to a threshold (for example, the threshold may be 16) or a block size of the current block is the smallest size that is predefined or signaled in a parameter set, one merge index is coded in a bitstream to identify which candidate in the second list is used to predict the block. If a block size of the current block is greater than a threshold (for example, the threshold may be 16) or a block size of the current block is not the smallest size that is predefined or signaled in a parameter set, a merge index is coded in a bitstream to identify which candidate in the first list is used to predict the block.

Figure 10:
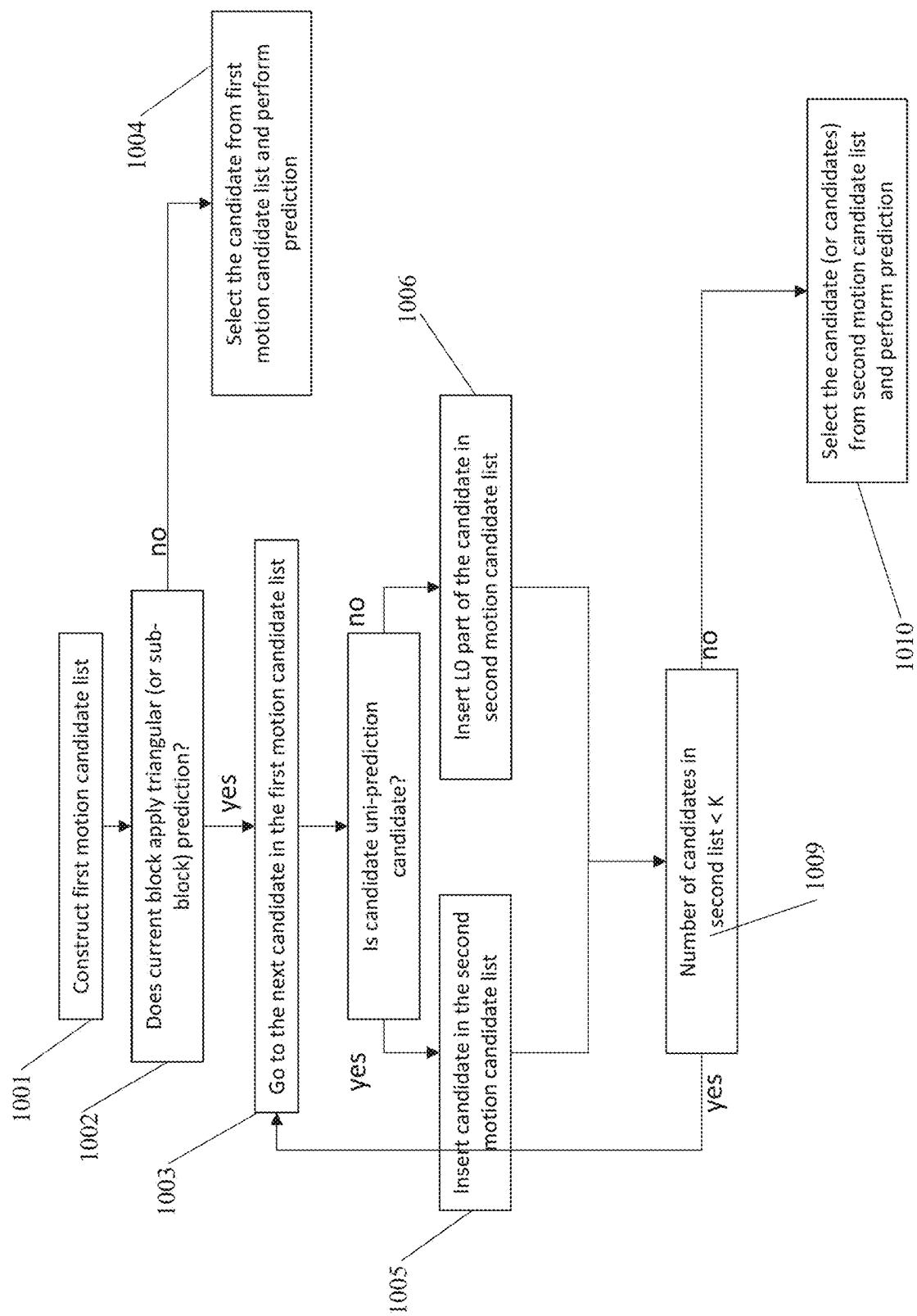
FIG. 10 is a flowchart showing another example of the construction of second motion candidate list based on the first motion candidate list.

According to embodiment 7, if the motion candidate in first list is bi-prediction candidate, the candidate is added to the second list after the bi-prediction candidate is converted to a uni-prediction candidate. A bi-prediction motion candidate includes 2 motion vectors and 2 reference picture indices, one pair corresponding to the reference picture list L0 and the other pair corresponding to reference picture list L1. The converted uni-prediction candidate includes the reference picture index and the motion vector that correspond to the reference picture list L0. In embodiment 7, the motion data corresponding to reference picture list L1 is not used to generate a second uni-prediction candidate if the block is determined to apply triangular prediction. FIG. 10 illustrates the flowchart of the embodiment 7.

In an embodiment of the present disclosure (embodiment 8), according to the following operations to construct merge lists.

Operation 1: Construct a motion candidate list (first list) that includes motion information candidates with uni-prediction or bi-prediction.

The first list could be constructed according to the methods in the ITU-T H.265 and in the VVC, see the above examples and disclosures about the merge list construction process in H.265 and in VVC.

Operation 2: Construct a second list and a third list using the candidates in the first list as follows:

Operation 2.1: Start from the first candidate of the first list.

Operation 2.2: If the candidate is a uni-prediction candidate, add the candidate (motion information candidate) in the second list and in the third list.

or,

Operation 2.3: If the candidate is a bi-prediction candidate, two uni-prediction candidates are generated, one uni-prediction candidate is added into the second list and one uni-prediction candidate is added into the third list according to the following order:

the first motion information candidate includes the motion vector and the reference picture index corresponding to L0 reference picture list (The candidate is set as uni-prediction candidate before insertion into second list).

the second motion information candidate includes the motion vector and the reference picture index corresponding to L1 reference picture list (The candidate is set as uni-prediction candidate before insertion into third list).

Operation 2.4: go to the next candidate in the first list and continue with Operation 2.2 or Operation 2.3 until a specified amount of candidates are collected in the second list and the third list or until all the candidates in the first list are processed.

The first merge list, the second merge list and the third merge list may be used in the inter prediction process of a current block.

In an example, if triangular prediction is applied to the current block, one candidate in the second list and one candidate in the third list are selected to perform triangular prediction, one candidate is used in prediction process of a first triangular part and the other candidate is used in the prediction of a second triangular part.

In another example, if a block size of the current block is less than or equal to a threshold (for example, the threshold may be 16) or a block size of the current block is the smallest size that is predefined or signaled in a parameter set, one candidate in second list is selected to perform inter prediction of the current block. In this example, as the size of the current block is small, bi-prediction is disallowed for the current block.

In another example, if a merge mode is applied to the current block and a triangular prediction mode is not applied to the current block, one candidate in first list is selected to perform prediction of the current block, this example is same as the related process which disclosed in the ITU-T H.265 or VVC.

In an example, the first motion candidate list is the merge list.

It is noted that since the candidate list for the triangle (or sub-block) prediction is derived from the Merge mode candidate list, in an implementation, the candidate list might not an independent list. The candidate in the second candidate list might be represented by the indicator points to a candidate in the Merge mode candidate list.

Embodiment 8 discloses a method of constructing two motion information candidate lists (second list and third list), the second list and the third list comprises uni-prediction candidates.

The first list is used in prediction of a block, if triangular prediction is not applied to the block. In an example, the first list is used for coding blocks that are indicated to apply merge mode but not indicated to apply triangular prediction mode.

The second list and the third list are constructed based on the first list. If a triangular prediction is applied to a block, the motion information (or motion vector) candidates are selected from the second list and from the third list. The second list and the third list comprises uni-prediction candidates, the candidates can be applied to first and the second triangular parts of the block. In an example, 2 merge indices are coded in a bitstream if triangular merge mode is applied to the block. The first merge index identify which candidate in the second list is used for the first triangular part of the block and which candidate in the third list is used for the second triangular part of the block.

In another example, if a block size of the current block is less than or equal to a threshold (for example, the threshold may be 16) or a block size of the current block is the smallest size that is predefined or signaled in a parameter set, one merge index is coded in a bitstream to identify which candidate in the second list is used to predict the block. If a block size of the current block is greater than a threshold (for example, the threshold may be 16) or a block size of the current block is not the smallest size that is predefined or signaled in a parameter set, a merge index is coded in a bitstream to identify which candidate in the first list is used to predict the block.

In another example, if the block is determined not to apply triangular prediction, other conditions can be checked to decide if the block uses the first motion candidate list or not. In one example if a block is determined not to apply triangular prediction, it is further determined if the block applies merge mode or not. If merge mode is applied, first motion candidate list is used in predicting the block, and if merge mode is not applied, other methods of predicting the current block (e.g. intra prediction) might be applied.

According to embodiment 8, a second and a third motion candidate lists are constructed based on the first motion candidate list. The second and the third lists may comprise uni-prediction candidates only, therefore have the advantage not comprising non-usable candidates (for example, bi-predictive candidates). Therefore, the indicator, to signal which candidate is used, can be represented by fewer number of bits, which improve the compression efficiency.

In an embodiment of the present disclosure (embodiment 9), according to the following operations to construct merge lists.

Operation 1: Construct a motion candidate list (first list) that includes motion information candidates with uni-prediction or bi-prediction.

The first list could be constructed according to the methods in the ITU-T H.265 and in the VVC, see the above examples and disclosures about the merge list construction process in H.265 and in VVC.

Operation 1.1: Initialize a counter with a positive integer value N (the value of the counter is set equal to N).

Operation 2: Construct a second list using the candidates in the first list as follows:

Operation 2.1: Start from the first candidate of the first list.

Operation 2.2: If the candidate is a uni-prediction candidate, add the candidate (motion information candidate) in a second list.

or,

Operation 2.3: If the candidate is a bi-prediction candidate, two uni-prediction candidates are generated according to said one bi-prediction candidate, and the two uni-prediction candidates are added into the second list according to the following order:

the first candidate includes the motion vector and the reference picture index corresponding to L0 reference picture list. The motion vector is denoted mv_L0 and the POC value of the reference picture (calculated based on the reference picture index in list L0) is denoted as POC_L0.

the second candidate includes the motion vector and the reference picture index corresponding to L1 reference picture list. The motion vector is denoted mv_L1 and the POC value of the reference picture (calculated based on the reference picture index in list L1) is denoted as POC_L1.

If all of the conditions below are satisfied, the second candidate is inserted in the second list;
the value of the counter is greater than 0,
if either POC_L0 is not equal to POC_L1 or mv_L0 is not similar to mv_L1.
If value of the counter is equal to zero, then the second candidate is inserted in the second list.

If the value of the counter is greater than zero, the value of the counter is decremented by 1.

Operation 2.4: go to the next candidate in the first list and continue with Operation 2.2 or Operation 2.3 until a specified amount (number) of candidates are collected in the second list or until all the candidates in the first list are processed.

The specified number of candidates can be a predefined value or a value that is indicated in a bitstream. In one particular implementation the specified number is 5. In this case the candidates are added to the second list until 5 candidates are populated in the second list.

In an implementation, the value of N can be a predefined number, which is equal to 1.

According to the embodiment 9, the number of motion vector comparison operations (given by the conditional check "if either POC_L0 is not equal to POC_L1 or mv_L0 is not similar to mv_L1" in the above section) are limited to a maximum value of N. Since the hardware implementations have specific timing constraints, reducing and limiting the number of motion vector comparison operations help improve the processing throughput of hardware implementations.

According to the Embodiment 9, the motion vector comparison operation is required for the first N bi-prediction candidates in the first list. In the case of N equal to 1, the first bi-prediction candidate in the first list requires motion vector comparison operation before the two generated uni-prediction candidates are inserted into the second list. After the first bi-prediction candidate in the first list is processed according to the operation of 2.3, the remaining bi-prediction candidates do not require motion vector comparison operation.

Alternatively, the second merge list may be constructed according to the following operations:

Operation 1: Construct a motion candidate list (first list) that includes motion information candidates with uni-prediction or bi-prediction.

The first list could be constructed according to the methods in the ITU-T H.265 and in the VVC, see the above examples and disclosures about the merge list construction process in H.265 and in VVC.

Operation 1.1: Initialize a counter with a positive integer value N (the value of the counter is set equal to N).

Operation 2: Construct a second list using the candidates in the first list as follows:

Operation 2.1: Start from the first candidate of the first list.

Operation 2.2: If the candidate is a uni-prediction candidate, add the candidate (motion information candidate) in the second list.

or,

Operation 2.3: If the candidate is a bi-prediction candidate, two uni-prediction candidates are generated according to said one bi-prediction candidate, and the two uni-prediction candidates are added into the second list according to the following order:

the first candidate includes the motion vector and the reference picture index corresponding to L0 reference picture list. The motion vector is denoted mv_L0 and the POC value of the reference picture (calculated based on the reference picture index in list L0) is denoted as POC_L0.

the second candidate includes the motion vector and the reference picture index corresponding to L1 reference picture list. The motion vector is denoted mv_L1 and the POC value of the reference picture (calculated based on the reference picture index in list L1) is denoted as POC_L1.

If all of the conditions below are satisfied, the second candidate is inserted in the second list;
the value of the counter is greater than 0,
if either POC_L0 is not equal to POC_L1 or mv_L0 is not similar to mv_L1.
If value of the counter is equal to zero, then the second candidate is inserted in the second list.

Operation 2.4: If the value of the counter is greater than zero, the value of the counter is decremented by 1.

Operation 2.5: go to the next candidate in the first list and continue with Operation 2.2 or Operation 2.3 until a specified amount of candidates are collected in the second list or until all the candidates in the first list are processed.

The specified number of candidates can be a predefined value or a value that is indicated in the bitstream. In one particular implementation the specified number is 5. In this case the candidates are added to the second list until 5 candidates are populated in the second list. In one particular implementation the value of N can be a predefined number, which is equal to 1.

According to the alternative of embodiment 9, the number of motion vector comparison operations (described as the conditional check "if either POC_L0 is not equal to POC_L1 or mv_L0 is not similar to mv_L1" in the above section) are limited to a maximum value of N. Since the hardware implementations have specific timing constraints, reducing and limiting the number of motion vector comparison operations help improve the processing throughput of hardware implementations.

According to the alternative of embodiment 9, the motion vector comparison operation is required for the first N candidates in the first list. In the case of N equal to 1, the first bi-candidate in the first list requires motion vector comparison operation if it is a bi-prediction candidate. After the first candidate in the first list is processed according to the operation of 2.3, the remaining bi-prediction candidates do not require motion vector comparison operation.

In the first example, the counter is decremented by 1, after the first bi-prediction candidate in the first list is processed (by generating two uni-prediction candidates and inserting into the second list). In the second example, the counter is decremented by 1 after the first candidate in the first list is processed, irrespective of whether the said candidate is uni-prediction or bi-prediction candidate.

The first merge list and the second merge list may be used in the inter prediction process of a current block. It is noted that since the candidate list for the triangle (or sub-block) prediction is derived from the Merge mode candidate list, in an implementation, the candidate list might not an independent list. The candidate in the second candidate list might be represented by the indicator points to a candidate in the Merge mode candidate list.

In an example, if triangular prediction is applied to the current block, two candidates in the second list are selected to perform triangular prediction, one candidate is used in prediction process of a first triangular part and the other candidate is used in the prediction of a second triangular part.

In another example, if a block size of the current block is less than or equal to a threshold (for example, the threshold may be 16) or a block size of the current block is the smallest size that is predefined or signaled in a parameter set, one motion information candidate in second list is selected to perform inter prediction of the current block. In this example, as the size of the current block is small, bi-prediction is disallowed for the current block.

In another example, if a merge mode is applied to the current block and a triangular prediction mode is not applied to the current block, one candidate in first list is selected to perform prediction of the current block, this example is same as the related process which disclosed in the ITU-T H.265 or VVC.

In an example, the second candidate in Operation 2.3 is not added to the second list if POC_L0 is equal to POC_L1 and if mv_L0 is identical to mv_L1.

In another example, the second candidate in Operation 2.3 is not added to the second list if reference picture index of L0 part is same as reference picture index of L1 part and if and if mv_L0 is identical (or alternatively similar) to mv_L1.

In an example, the similarity of two motion vectors may be determined according to following inequalities:

$$-K<(MV1.x-MV2.x)<K \text{ and } -K<(MV1.y-MV2.y)<K$$

where the MV1.x denotes the x component of the first motion vector (the means of MV2.x is similar as MV1.x), MV1.y (the means of MV2.y is similar as MV1.y) denotes the y component, K is a positive number. In this example if both inequalities hold, the motion vector MV1 is considered to be similar to motion vector MV2.

In another example, the similarity may be determined based on the following equalities:

$$(MV1.x>>N)-(MV2.x>>N)<K \text{ and } (MV1.x>>N)-(MV2.x>>N)<K.$$

where, x>>y means Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. "==" is the rational operation which is true when each side of the operator is identical. In this example if both equalities hold, the motion vector MV1 is considered to be similar to motion vector MV2.

In an example, the first motion candidate list is the merge list.

In operation 2.3 the second candidate (which is a uni-prediction candidate that is generated based on the L1 part of the bi-prediction candidate of first motion candidate list) is added to the second motion candidate list only if it is sufficiently different from the first candidate (which is a uni-prediction candidate that is generated based on the L0 part of the bi-prediction candidate of first motion candidate list).

Since the L1 part is not inserted in the second list when it is similar to L0 part (or identical), the compression efficiency is improved.

Embodiment 9 discloses a method of constructing a motion information candidate list (second list), the second list comprises uni-prediction candidates.

The first list is used in prediction of a block, if triangular prediction is not applied to the block. In an example, the first list is used for coding blocks that are indicated to apply merge mode but not indicated to apply triangular prediction mode.

The second list is constructed based on the first list. If a triangular prediction is applied to a block, the motion information (or motion vector) candidates are selected from the second list. The second list comprises uni-prediction candidates, the candidates can be applied to first and the second triangular parts of the block. In an example, 2 merge indices are coded in a bitstream if triangular merge mode is applied to the block. The merge indices identify which candidate in the second list is used for the first or the second triangular part of the block.

In another example, if a block size of the current block is less than or equal to a threshold (for example, the threshold may be 16) or a block size of the current block is the smallest size that is predefined or signaled in a parameter set, one merge index is coded in a bitstream to identify which candidate in the second list is used to predict the block. If a block size of the current block is greater than a threshold (for example, the threshold may be 16) or a block size of the current block is not the smallest size that is predefined or signaled in a parameter set, a merge index is coded in a bitstream to identify which candidate in the first list is used to predict the block.

In another example, if the block is determined not to apply triangular prediction, other conditions can be checked to decide if the block uses the first motion candidate list or not. In one example if a block is determined not to apply triangular prediction, it is further determined if the block applies merge mode or not. If merge mode is applied, first motion candidate list is used in predicting the block, and if merge mode is not applied, other methods of predicting the current block (e.g. intra prediction) might be applied.

According to embodiment 9, a second motion candidate lists is constructed based on the first motion candidate list. The second list may comprise uni-prediction candidates only, therefore have the advantage not comprising non-usable candidates (for example, bi-predictive candidates). Therefore, the indicator, to signal which candidate is used, can be represented by fewer number of bits, which improve the compression efficiency.

It is noted that in embodiments 1-9, the aspects are explained using the terms "first list" and "second list", where the motion information candidates in the second list are used to predict the coding block if the coding block is coded with triangle or sub-block prediction modes. The present disclosure can also be seen as a modification to the rules for constructing the first list. Since the first list can not only contain uni-prediction candidates, but also contain bi-prediction candidates, it cannot be used in the prediction of a coding block that is predicted using triangular prediction (which requires that all selectable candidates have to be uni-prediction candidates). Therefore, the present disclosure can be seen as a modification to the list construction rules that are described for instance in ITU-T H.265 standard or the VVC draft standard. In fact, the disclosed aspects can apply to any motion information list that includes uni-prediction and bi-prediction candidates, and the goal of the present disclosure is to modify the list construction rules in such a way that the resulting motion information candidate list only includes uni-prediction candidates. Therefore, modified list construction rules can be applied to obtain motion information candidates that can be used to predict a coding block that is predicted using triangular (or sub-block) prediction. In other words, the embodiments 1-9 describe rule modifications that are necessary to obtain a motion information candidate list that comprises only uni-prediction candidates, given a set of rules for constructing a merge list that comprises both uni-prediction and bi-prediction candidates.

Example 1. A method of processing a block according to a merge candidate list, the method comprising:
constructing a first list according to motion information of neighboring blocks of a current block;
constructing a second list according to the first list;
obtaining prediction information or block size information of the current block;
using, according to the prediction information or block size information of the current block, the first list or the second list to perform inter prediction of the current block.

Example 2. The method of example 1, wherein all the candidates of the second list are uni-prediction candidates.

Example 3. The method of example 1 or 2, wherein the constructing a second list according to the first list, comprises:
generating two uni-prediction candidates according to one bi-prediction candidate of the first list;
constructing the second list according to the two uni-prediction candidates.

Example 4. The method of example 1 or 2, wherein the constructing a second list according to the first list, comprises:
generating one uni-prediction candidate according to one bi-prediction candidate of the first list;
constructing the second list according to the one uni-prediction candidate.

Example 5. The method of example 1 or 2, wherein the constructing a second list according to the first list, comprises:
generating two uni-prediction candidates according to one bi-prediction candidate of the first list;
constructing the second list according to at least one uni-prediction candidate of the first list and the two uni-prediction candidates.

Example 6. The method of example 1 or 2, wherein the constructing a second list according to the first list, comprises:
generating two uni-prediction candidates according to one bi-prediction candidate of the first list;
determining a similarity between the two uni-prediction candidates;
constructing the second list according to the two uni-prediction candidates and the result of the determine the similarity.

Example 7. The method of any one of examples 1 to 6, wherein the constructing a second list according to the first list, comprises:
inserting at least one uni-prediction candidate of the first list into the second list according to splitting a bi-prediction candidate of the first list into two uni-prediction candidates.

Example 8. The method of any one of examples 1 to 6, wherein the constructing a second list according to the first list, comprises:
inserting at least one uni-prediction candidate of the first list into the second list according to the order of the at least one uni-prediction candidate in the first list and according to splitting a bi-prediction candidate of the first list into two uni-prediction candidates.

Example 9. The method of any one of examples 1 to 8, wherein the method further comprises:
determining a similarity between two components of a bi-prediction candidate of the first list,
updating the first list according to the result of the determine the similarity;
correspondingly, the constructing a second list according to the first list, comprises:
constructing the second list according to the updated first list.

Example 10. The method of any one of examples 1 to 9, wherein a size of the second list is smaller than or equal to a size of the first list.

Example 11. The method of any one of examples 1 to 9, wherein a size of the second list is determined according to a block size of the current block.

Example 12. The method of any one of examples 1 to 9, wherein a size of the second list is determined according to a width length or a height length of the current block.

Example 13. The method of any one of examples 1 to 12, wherein the using, according to the prediction information or block size information of the current block, the first list or the second list to perform inter prediction comprises:
when a triangular prediction (or sub-block prediction) is applied to the current block, the second list is used to predict the current block;
or
when a triangular prediction (or sub-block prediction) is not applied to the current block, the first list is used to predict the current block.

Example 14. The method of any one of examples 1 to 13, wherein the using, according to the prediction information or block size information of the current block, the first list or the second list to perform inter prediction comprises:
when a block size of the current block is less than or equal to a threshold (for example, the threshold may be 16) or a block size of the current block is the smallest size that is predefined or signaled in a parameter set, the second list is used to predict the current block;
or
when a block size of the current block is greater than a threshold (for example, the threshold may be 16) or a block size of the current block is not the smallest size in the that is predefined or signaled in a parameter set the first list is used to predict the current block.

Example 15. An encoder (20) comprising processing circuitry for carrying out the method according to any one of examples 1 to 14.

Example 16. A decoder (30) comprising processing circuitry for carrying out the method according to any one of examples 1 to 14.

Example 17. A computer program product comprising a program code for performing the method according to any one of examples 1 to 14.

Example 18. A decoder, comprising:
one or more processors; and
a non-transitory computer-readable storage medium coupled to the processors and storing programming for execution by the processors, wherein the programming, when executed by the processors, configures the decoder to carry out the method according to any one of examples 1 to 14.

Example 19. An encoder, comprising:
one or more processors; and
a non-transitory computer-readable storage medium coupled to the processors and storing programming for execution by the processors, wherein the programming, when executed by the processors, configures the encoder to carry out the method according to any one of examples 1 to 14.

Although embodiments of the present disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Following is an explanation of the applications of the encoding method as well as the decoding method as shown in the above-mentioned embodiments, and a system using them.

Figure 16:
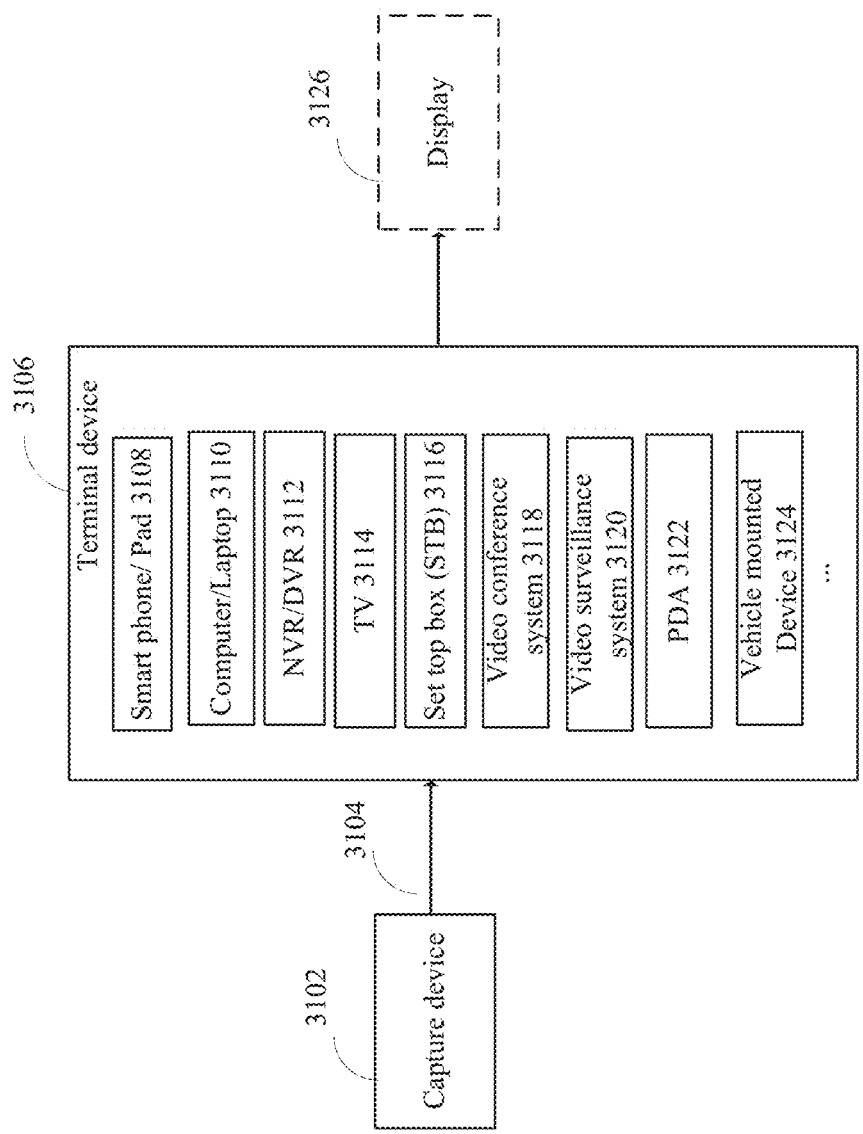
FIG. 16 is a block diagram showing an example structure of a content supply system 3100 which realizes a content delivery service.

FIG. 16 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 17:
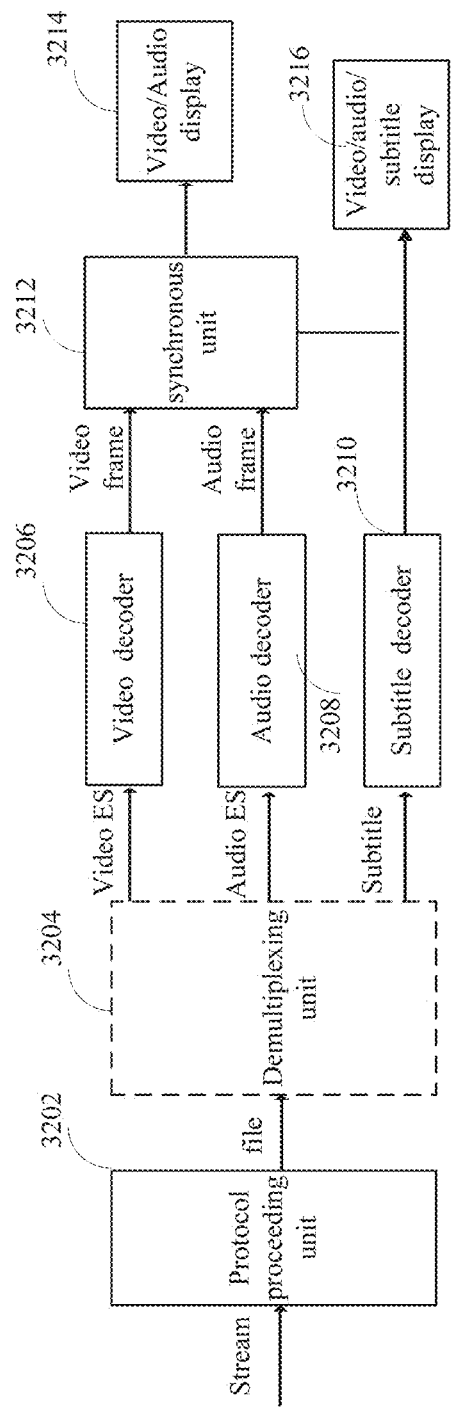
FIG. 17 is a block diagram showing a structure of an example of a terminal device.

FIG. 17 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 17) before feeding it to the synchronous unit 3212. Similarly, the audio frame may store in a buffer (not shown in FIG. 17) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter operative hardware units, including one or more processors as described above, in conjunction with suitable software and/or firmware.

The invention claimed is:

1. A method of processing a block according to a merge candidate list, the method comprising:
constructing a first list according to motion information of neighboring blocks of a current block, wherein the motion information includes the information whether one or two reference picture lists are used, a reference index, and a motion vector for each reference picture list, and wherein the first list is a merge candidate list;
obtaining prediction information of the current block;
if the prediction information of the current block indicates that a sub-block prediction is applied to the current block,
obtaining a uni-prediction candidate for the current block according to the first list; and
using, the uni-prediction candidate for the current block to perform inter prediction of the current block,
wherein constructing the first list further comprises:
after checking whether a neighboring block is available and contains the motion information, performing redundancy checks before using the motion information of the neighboring blocks as merge candidates in the first list, wherein the redundancy checks ensure that the merge candidates with same motion information are excluded from the first list, and wherein the redundancy checks include a first redundancy check performed among left, top-right, top, and top-left neighboring blocks, and a second redundancy check performed among left, bottom-left, and top-left neighboring blocks.

2. The method of claim 1, wherein the current block comprises two sub-blocks, and wherein each sub-block corresponds to a uni-prediction candidate, and wherein the uni-prediction candidate is obtained without generating a uni-prediction merge candidate list for the sub-block prediction.

3. The method of claim 1, wherein one uni-prediction candidate is generated according to one bi-prediction candidate of the first list.

4. The method of claim 1, wherein two uni-prediction candidates are generated according to one bi-prediction candidate of the first list.

5. The method of claim 3, wherein one uni-prediction candidate is a first part of the bi-prediction candidate.

6. The method of claim 3, wherein one uni-prediction candidate is a second part of the bi-prediction candidate.

7. The method of claim 1, wherein the sub-block prediction is a triangular prediction.

8. The method of claim 4, wherein generation of the two uni-prediction candidates according to the one bi-prediction candidate of the first list comprise:

determining a similarity between the two uni-prediction candidates.

9. The method of claim 1, wherein the uni-prediction candidate is generated according to a bi-prediction candidate of the first list based on a candidate order in the first list.

10. A non-transitory computer-readable medium having stored thereon instructions that, when executed by one or more processors, cause the one or more processors to perform operations including:
constructing a first list according to motion information of neighboring blocks of a current block, wherein the motion information includes the information whether one or two reference picture lists are used, a reference index, and a motion vector for each reference picture list, and wherein the first list is a merge candidate list;
obtaining prediction information of the current block;
if the prediction information of the current block indicates that a sub-block prediction is applied to the current block,
obtaining a uni-prediction candidate for the current block according to the first list; and
using, the uni-prediction candidate for the current block to perform inter prediction of the current block,
wherein constructing the first list further comprises:
after checking whether a neighboring block is available and contains the motion information, performing redundancy checks before using the motion information of the neighboring blocks as merge candidates in the first list, wherein the redundancy checks ensure that the merge candidates with same motion information are excluded from the first list, and wherein the redundancy checks include a first redundancy check performed among left, top-right, top, and top-left neighboring blocks, and a second redundancy check performed among left, bottom-left, and top-left neighboring blocks.

11. The non-transitory computer-readable medium of claim 10, wherein the current block comprises two sub-blocks, and wherein each sub-block corresponds to a uni-prediction candidate, and wherein the uni-prediction candidate is obtained without generating a uni-prediction merge candidate list for the sub-block prediction.

12. The non-transitory computer-readable medium of claim 10, wherein one uni-prediction candidate is generated according to one bi-prediction candidate of the first list.

13. The non-transitory computer-readable medium of claim 12, wherein one uni-prediction candidate is a first part of the bi-prediction candidate.

14. The non-transitory computer-readable medium of claim 12, wherein one uni-prediction candidate is a second part of the bi-prediction candidate.

15. A decoder, comprising:
one or more processors; and a non-transitory computer-readable storage medium coupled to the processors and storing instructions for execution by the processors, wherein the instructions, when executed by the processors, causes the decoder to:
construct a first list according to motion information of neighboring blocks of a current block, wherein the motion information includes the information whether one or two reference picture lists are used, a reference index, and a motion vector for each reference picture list, and wherein the first list is a merge candidate list;
obtain prediction information of the current block;
if the prediction information of the current block indicates that a sub-block prediction is applied to the current block,
obtain a uni-prediction candidate for the current block according to the first list; and
use, the uni-prediction candidate for the current block to perform inter prediction of the current block,
wherein constructing the first list further comprises:
after checking whether a neighboring block is available and contains the motion information, performing redundancy checks before using the motion information of the neighboring blocks as merge candidates in the first list, wherein the redundancy checks ensure that the merge candidates with same motion information are excluded from the first list, and wherein the redundancy checks include a first redundancy check performed among left, top-right, top, and top-left neighboring blocks, and a second redundancy check performed among left, bottom-left, and top-left neighboring blocks.

16. The decoder of claim 15, wherein the current block comprises two sub-blocks, and wherein each sub-block corresponds to a uni-prediction candidate, and wherein the uni-prediction candidate is obtained without generating a uni-prediction merge candidate list for the sub-block prediction.

17. The decoder of claim 15, wherein one uni-prediction candidate is generated according to one bi-prediction candidate of the first list.

18. The decoder of claim 17, wherein one uni-prediction candidate is a first part of the bi-prediction candidate.

19. The decoder of claim 17, wherein one uni-prediction candidate is a second part of the bi-prediction candidate.

20. The decoder of claim 15, wherein the sub-block prediction is a triangular prediction.

* * * * *